(12) United States Patent
Mossoba et al.

(10) Patent No.: US 11,727,402 B2
(45) Date of Patent: Aug. 15, 2023

(54) UTILIZING MACHINE LEARNING AND NETWORK ADDRESSES TO VALIDATE ONLINE TRANSACTIONS WITH TRANSACTION CARDS

(71) Applicant: Capital One Services, LLC, McLean, VA (US)

(72) Inventors: Michael Mossoba, Arlington, VA (US); Joshua Edwards, Philadelphia, PA (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 46 days.

(21) Appl. No.: 16/859,438

(22) Filed: Apr. 27, 2020

(65) Prior Publication Data

US 2021/0334798 A1 Oct. 28, 2021

(51) Int. Cl.
*G06Q 20/40* (2012.01)
*G06N 20/00* (2019.01)

(52) U.S. Cl.
CPC ............. *G06Q 20/40* (2013.01); *G06N 20/00* (2019.01)

(58) Field of Classification Search
CPC ............. G06Q 20/40; G06Q 20/3674; G06Q 20/401; G06N 20/00; G06N 7/00; H04L 63/205
USPC ........................................................... 705/44
See application file for complete search history.

(56) References Cited

U.S. PATENT DOCUMENTS

| | | | |
|---|---|---|---|
| 10,977,654 B2 * | 4/2021 | Kumar | G06Q 40/00 |
| 2015/0379430 A1 * | 12/2015 | Dirac | G06N 20/00 706/12 |
| 2017/0230256 A1 * | 8/2017 | Urbach | H04L 41/50 |
| 2020/0120144 A1 * | 4/2020 | Yadav | G06Q 20/4016 |
| 2020/0202268 A1 * | 6/2020 | Retna | G06N 20/00 |
| 2022/0122087 A1 * | 4/2022 | Gosset | G06Q 20/4016 |

* cited by examiner

*Primary Examiner* — Scott S Trotter
*Assistant Examiner* — William D Newlon
(74) *Attorney, Agent, or Firm* — Harrity & Harrity, LLP

(57) ABSTRACT

A device may receive, from a payment processor server device, a transaction card number and a network address of a client device, wherein the transaction card number and the client device are associated with a customer attempting to conduct an online transaction with a merchant via a merchant server device. The device may process the transaction card number and the network address, with a machine learning model, to determine whether to approve or deny the online transaction. The device may selectively provide, to the client device and the merchant server device, data indicating that the online transaction is approved when the machine learning model determines to approve the online transaction, or provide, to the client device and the merchant server device, data indicating that the online transaction is denied when the machine learning model determines to deny the online transaction.

20 Claims, 19 Drawing Sheets

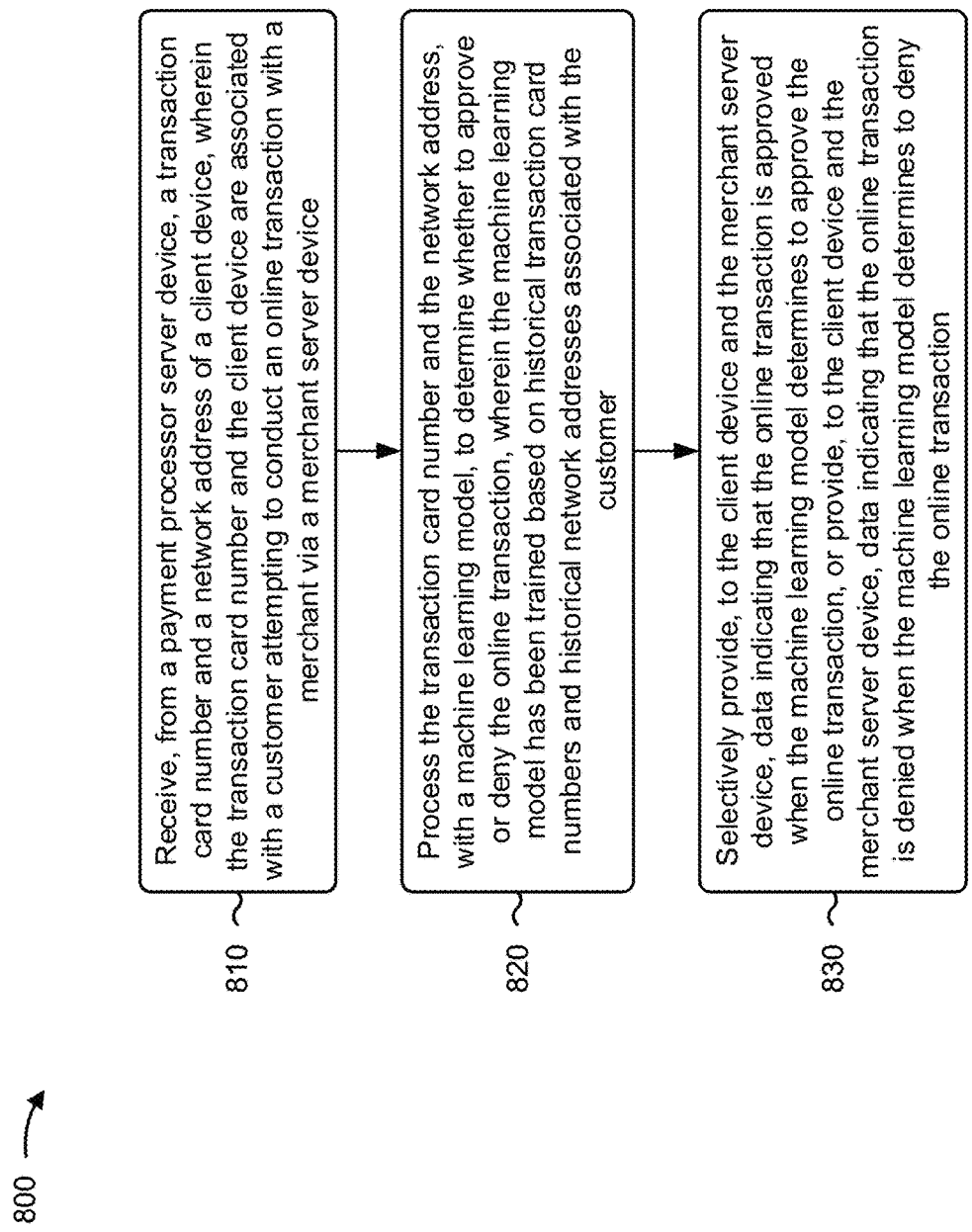

UTILIZING MACHINE LEARNING AND NETWORK ADDRESSES TO VALIDATE ONLINE TRANSACTIONS WITH TRANSACTION CARDS

BACKGROUND

Online fraud is a type of fraud that makes use of the Internet and may involve hiding of information or providing incorrect information for the purpose of tricking victims out of money, property, inheritance, and/or the like. Online fraud is not considered a single, distinctive crime but covers a range of illegal and illicit actions that are committed in cyberspace.

SUMMARY

According to some implementations, a method may include receiving, from a payment processor server device, a transaction card number and a network address of a client device, wherein the transaction card number and the client device may be associated with a customer attempting to conduct an online transaction with a merchant via a merchant server device. The method may include processing the transaction card number and the network address, with a machine learning model, to determine whether to approve or deny the online transaction. The method may include selectively providing, to the client device and the merchant server device, data indicating that the online transaction is approved when the machine learning model determines to approve the online transaction; or providing, to the client device and the merchant server device, data indicating that the online transaction is denied when the machine learning model determines to deny the online transaction.

According to some implementations, a device may include one or more memories, and one or more processors to receive, from a merchant server device, a network address of a client device of a customer attempting to conduct an online transaction with a merchant via a transaction card number or a customer identifier of the customer, and process the network address, with a machine learning model, to determine whether the network address is valid or invalid for the customer. The one or more processors may provide, to the client device and the merchant server device, data indicating that the online transaction is denied due to an invalid network address when the machine learning model determines that the network address is invalid for the customer. Alternatively, the one or more processors may provide, to the merchant server device, data indicating that the network address is valid for the customer when the machine learning model determines that the network address is valid for the customer; may receive, from a payment processor server device, the transaction card number when the machine learning model determines that the network address is valid for the customer; and may process the transaction card number, with a fraud model, to determine whether to approve or deny the online transaction.

According to some implementations, a non-transitory computer-readable medium may store one or more instructions the, when executed by one or more processors of a device, may cause the one or more processors to receive, from a payment processor server device, a transaction card number and a network address of a client device, wherein the transaction card number and the client device may be associated with a customer attempting to conduct an online transaction with a merchant via a merchant server device. The one or more instructions may cause the one or more processors to process the transaction card number and the network address, with a machine learning model, to determine whether to approve or deny the online transaction, wherein the machine learning model may have been trained based on historical transaction card numbers and historical network addresses associated with the customer. The one or more instructions may cause the one or more processors to selectively provide, to the client device and the merchant server device, data indicating that the online transaction is approved when the machine learning model determines to approve the online transaction, or provide, to the client device and the merchant server device, data indicating that the online transaction is denied when the machine learning model determines to deny the online transaction.

BRIEF DESCRIPTION OF THE DRAWINGS

FIGS. 6-8 are flow charts of example processes for utilizing machine learning and network addresses to validate online transactions with transaction cards.

DETAILED DESCRIPTION

Figure 1A:
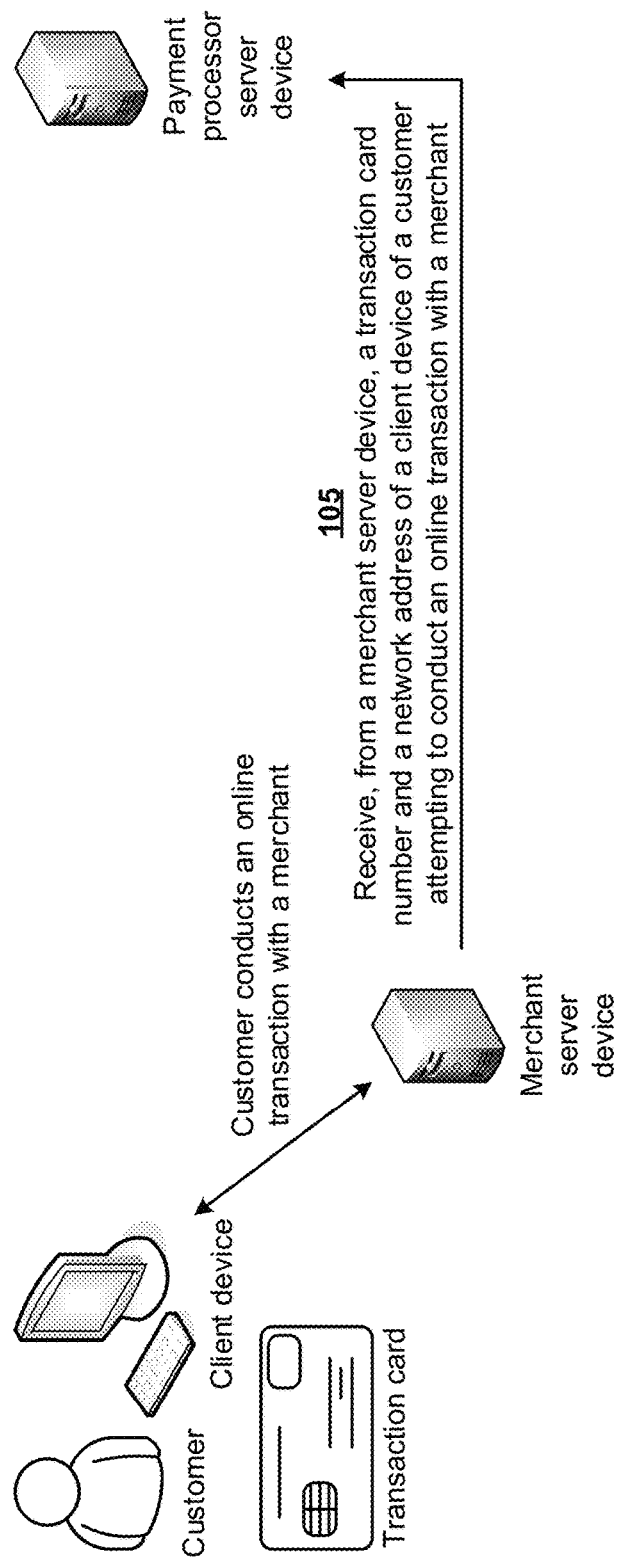
FIGS. 1A-1L are diagrams of one or more example implementations described herein.

The following detailed description of example implementations refers to the accompanying drawings. The same reference numbers in different drawings may identify the same or similar elements.

Online fraud is increasing more rapidly than in-person fraud, and affects both transaction card issuers (e.g., financial institutions) and merchants. However, there is only limited information that each party has about an online transaction, and this information is not always shared. For example, a merchant server device handling an online transaction with a transaction card may not share information with a server device associated with a financial institution that issued the transaction card. Such information may be vital in determining whether the online transaction is fraudulent. Thus, current techniques for handling online fraud may waste computing resources (e.g., processing resources, memory resources, communication resources, and/or the like), networking resources, and/or the like associated with attempting to validate online transactions, handling claims associated with fraudulent online transactions, paying for money lost due to fraudulent online transactions, and/or like.

Some implementations described herein provide a processing platform that utilizes machine learning and network addresses to validate online transactions with transaction cards. For example, the processing platform may receive, from a payment processor server device, a transaction card number and a network address of a client device. The transaction card number and the client device may be associated with a customer attempting to conduct an online transaction with a merchant via a merchant server device. The processing platform may process the transaction card number and the network address, with a machine learning model, to determine whether to approve or deny the online transaction, and may provide, to the client device and the merchant server device, data indicating that the online transaction is approved when the machine learning model determines to approve the online transaction. Alternatively, the processing platform may provide, to the client device and the merchant server device, data indicating that the online transaction is denied when the machine learning model determines to deny the online transaction.

In this way, the processing platform utilizes machine learning and network addresses to validate online transactions with transaction cards in near-real time (e.g., while customers are conducting online transactions with merchants). For example, the processing platform enables merchants and transaction card issuers to share information to help avoid fraudulent online transactions. The information may include network addresses (e.g., Internet protocol (IP) addresses) associated with client devices of customers conducting online transactions with merchant server devices. The merchant server device may provide the network addresses to the processing platform, and the processing platform may better determine whether online transactions are fraudulent based on the network addresses. This, in turn, conserves computing resources, networking resources, and/or the like that would otherwise have been wasted in attempting to validate online transactions, handling claims associated with fraudulent online transactions, paying for money lost due to fraudulent online transactions, and/or like.

FIGS. 1A-1L are diagrams of one or more example implementations 100 described herein. As shown in FIG. 1A, a client device may be associated with a transaction card, a merchant server device, and a processing platform. The client device may include a mobile device, a computer, and/or the like associated with a customer. The transaction card may include a credit card, a debit card, a rewards card, a prepaid card, and/or the like associated with the customer. The merchant server device may include a server device associated with a merchant providing online shopping to the customer (e.g., via a merchant website). The processing platform may include a platform that utilizes machine learning and network addresses to validate online transactions with transaction cards in near-real time, as described herein.

As further shown in FIG. 1A, and by reference number 105, a payment processor server device may receive, from a merchant server device, a transaction card number and a network address of a client device of a customer attempting to conduct an online transaction with a merchant. For example, the customer may enter in payment information (e.g., the transaction card number, an expiration date associated with the transaction card, a name associated with the transaction card, and/or the like) in fields of a webpage to conduct an online transaction with the merchant. The client device may determine to send the payment information to the payment processor server device to authenticate the payment information. The payment processor server device may be used to submit transactions to an appropriate location (e.g., an appropriate card association). For example, the payment processor server device may submit the transaction information (e.g., the transaction card number, the network address, and/or the like) to the processing platform.

The payment processor server device may obtain a network address from the merchant server device and/or the client device used to conduct the transaction. The network address may be an identifier for a node or host on a telecommunications network. For example, the network address may include an IP address, such as an IPv4 address, IPv6 address, and/or the like. The network address may be used to identify a location associated with the client device.

In some implementations, the payment processor server device may use the transaction card number to determine where to send the transaction card number and the network address of the client device. For example, the payment processor server device may use a bank identification number that may be determined from the transaction card number to send to a device associated with a financial institution associated with the transaction card.

Figure 1B:
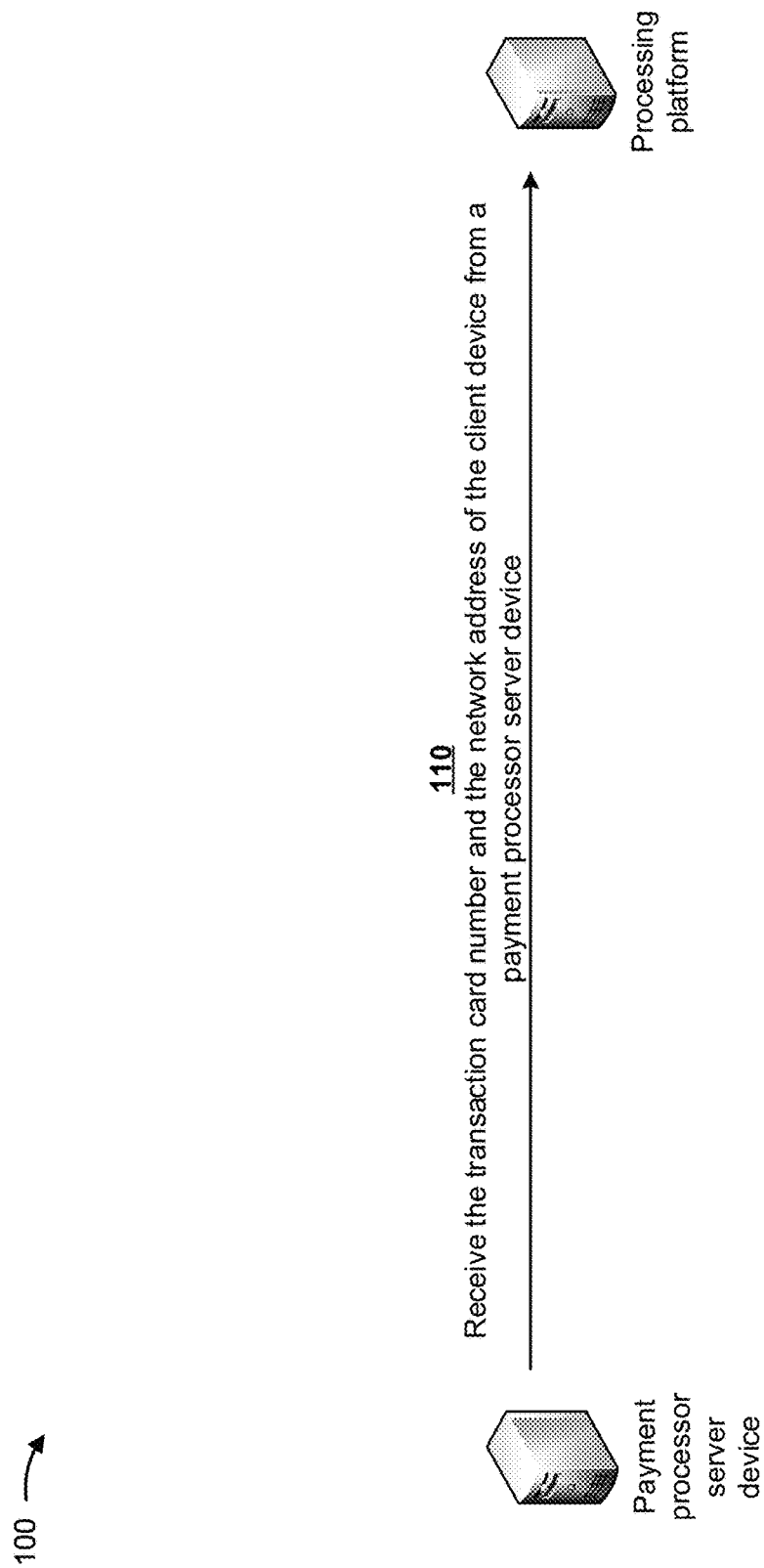

As shown in FIG. 1B, and by reference number 110, the processing platform may receive the transaction card number and the network address of the client device from the payment processor server device. Based on obtaining the transaction card number and the network address of the client device, the processing platform may perform one or more actions to determine whether to approve or deny the online transaction. In some implementations, the processing platform may have a limited time in processing the transaction card number and the network address.

In some implementations, there may be hundreds, thousands, and/or the like, of client devices that produce thousands, millions, billions, and/or the like, of data points provided in the transaction card numbers and the network addresses. In this way, the processing platform may handle thousands, millions, billions, and/or the like, of data points within a period of time (e.g., daily, weekly, monthly), and thus may provide "big data" capability. The processing platform may store the transaction card number and/or the network address in a data structure (e.g., a database, a table, a list, and/or the like) associated with the processing platform.

Figure 1C:
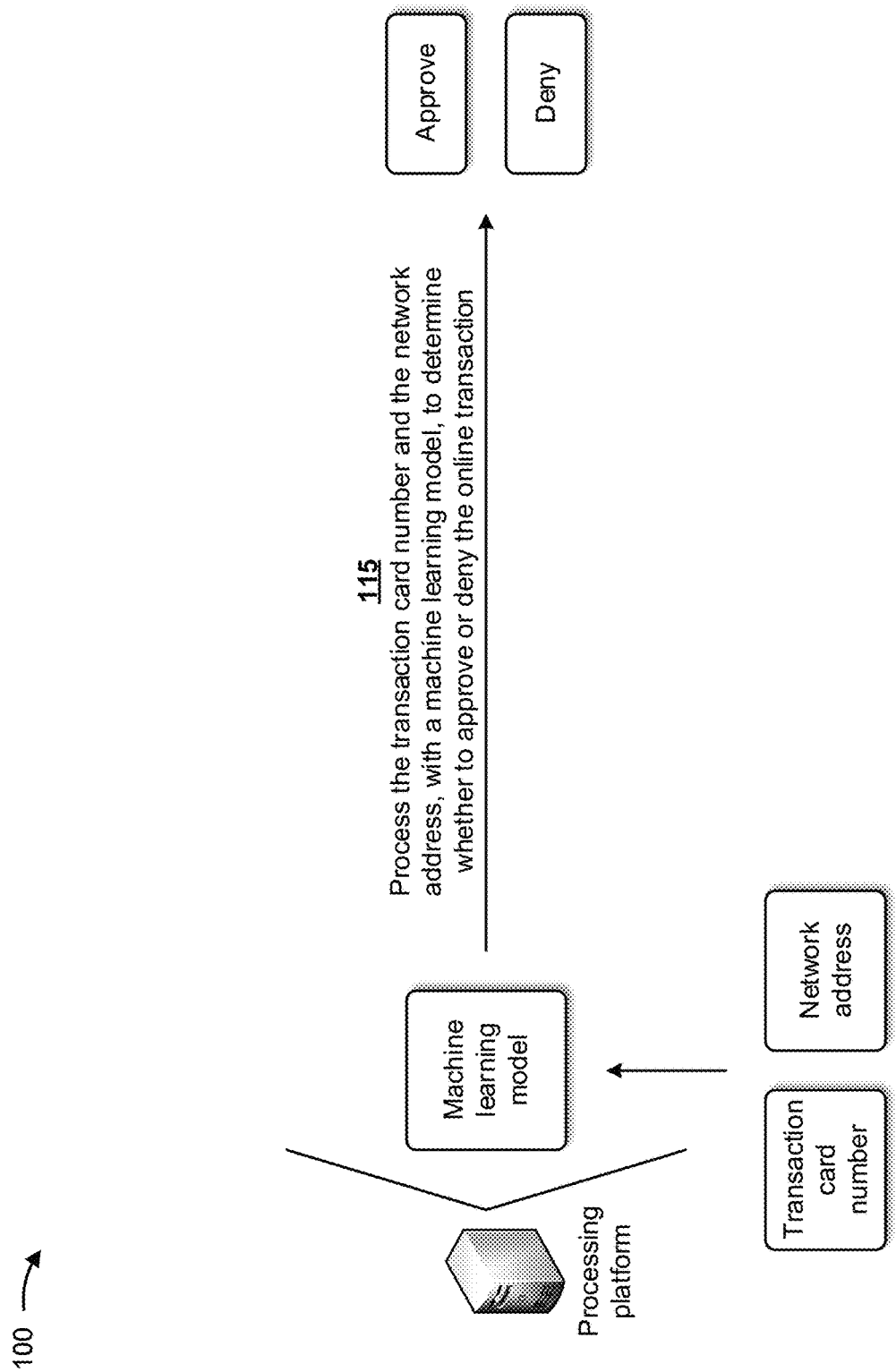

As shown in FIG. 1C, and by reference number 115, the processing platform may process that transaction card number and the network address, with a machine learning model, to determine whether to approve or deny the online transaction. In this way, the processing platform may determine characteristics of the transaction card number and/or the network address that may be indicative of fraud, and in turn, reduce time associated with determining whether to approve or deny the online transaction, increase accuracy in determining whether to approve or deny the online transaction, and/or the like In some implementations, the processing platform may train the machine learning model with historical data (e.g., historical transaction data, customer data, images of customers, names of customers, geographical locations of merchants, and/or the like) to generate a trained machine learning model. For example, the processing platform may use network addresses historically associated with the customer, network addresses associated with the financial institution, locations associated with the financial institution, locations associated with the customer, and/or the like to determine whether the network address falls within a CIDR (Classless Inter-Domain Routing) range that is nonindicative of fraud. In some implementations, the processing platform may determine or obtain information related to a network address associated with the customer, such as whether customer uses VPN (Virtual Private Network) services, network addresses previously associated with the customer from the merchant or other merchants, and/or the like. In some implementations, the processing platform may determine or obtain information associated with a location with the customer, such as a home location associated with the customer, information that the customer has traveled to another location, and/or the like. The processing platform may train the machine learning model in a manner similar to the manner described below in connection with FIG. 2. In some implementations, rather than training the machine learning model, the processing platform may obtain the machine learning model from another system or device that trained the machine learning model. In this case, the processing platform may provide the other system or device with historical data for use in training the machine learning model, and may provide the other system or device with updated historical data to retrain the machine learning model in order to update the machine learning model. In some implementations, the processing platform may apply the machine learning model to a new observation in a manner similar to the manner described below in connection with FIG. 3. In some implementations, the machine learning model may unveil characteristics that may be indicative of fraud for any customer or for a specific customer.

Figure 1D:
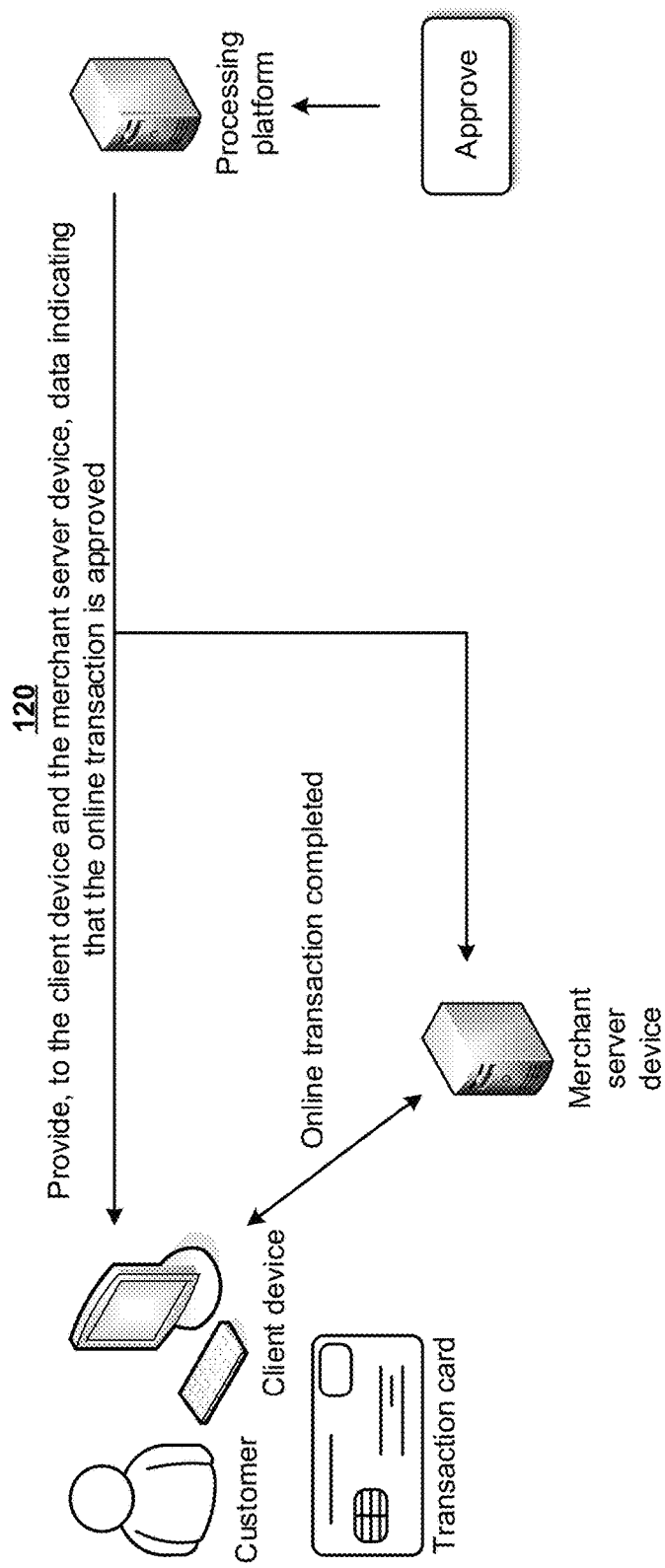

As shown in FIG. 1D, and by reference number 120, the processing platform may provide, to the client device and/or the merchant server device, data indicating that the online transaction is approved. Based on this, the merchant server device may determine to complete the online transaction. The client device may receive notification that the online transaction is approved.

Figure 1E:
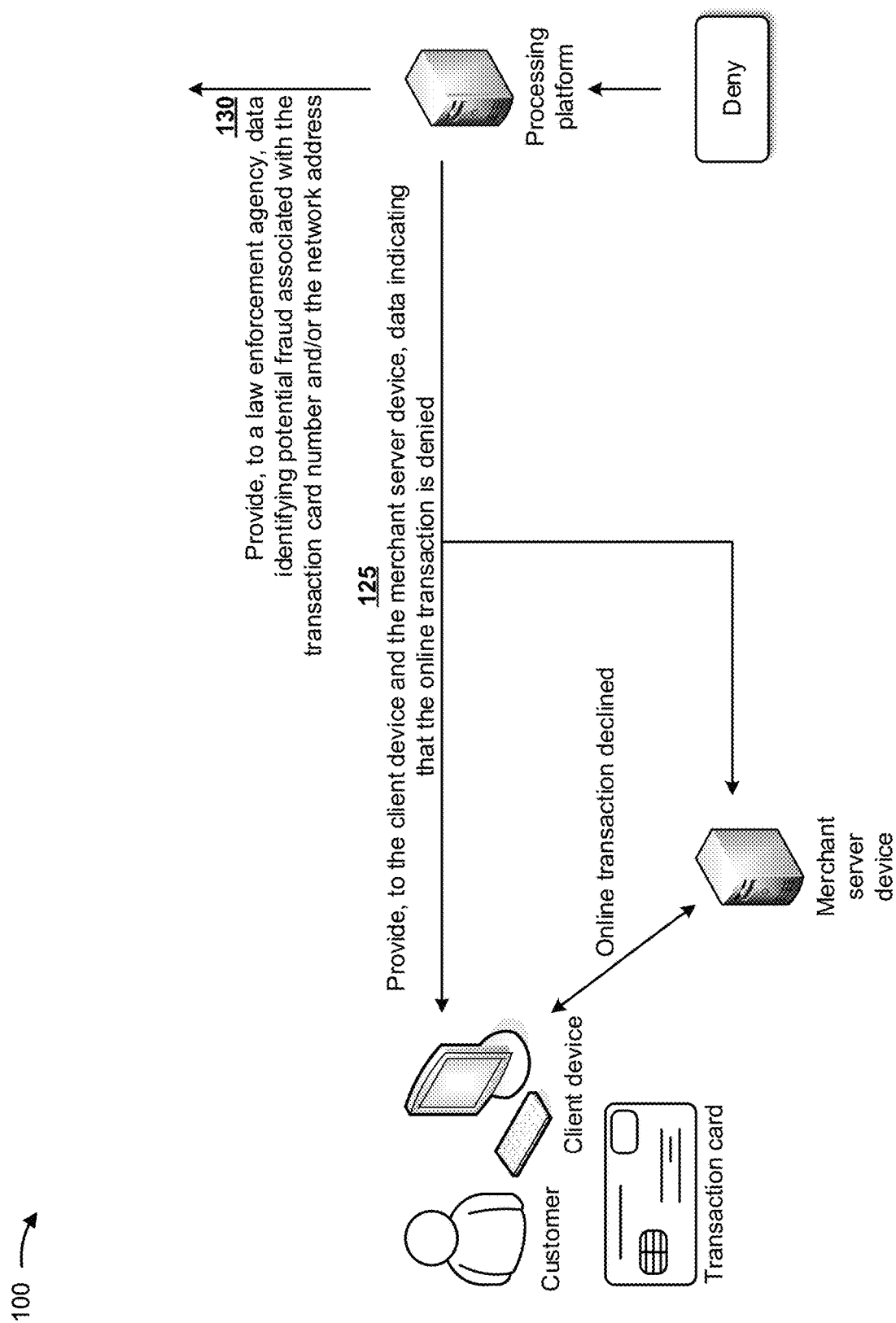

As shown in FIG. 1E, and by reference number 125, the processing platform may provide, to the client device and the merchant server device, data indicating that the online transaction is denied. The merchant server device may determine to deny the transaction based on the data indicating that the online transaction is denied. The client device may receive notification that the online transaction is declined. As further shown in FIG. 1E, and by reference number 130, the processing platform may provide, to a law enforcement agency, data identifying potential fraud associated with the transaction card number and/or the network address.

Figure 1F:
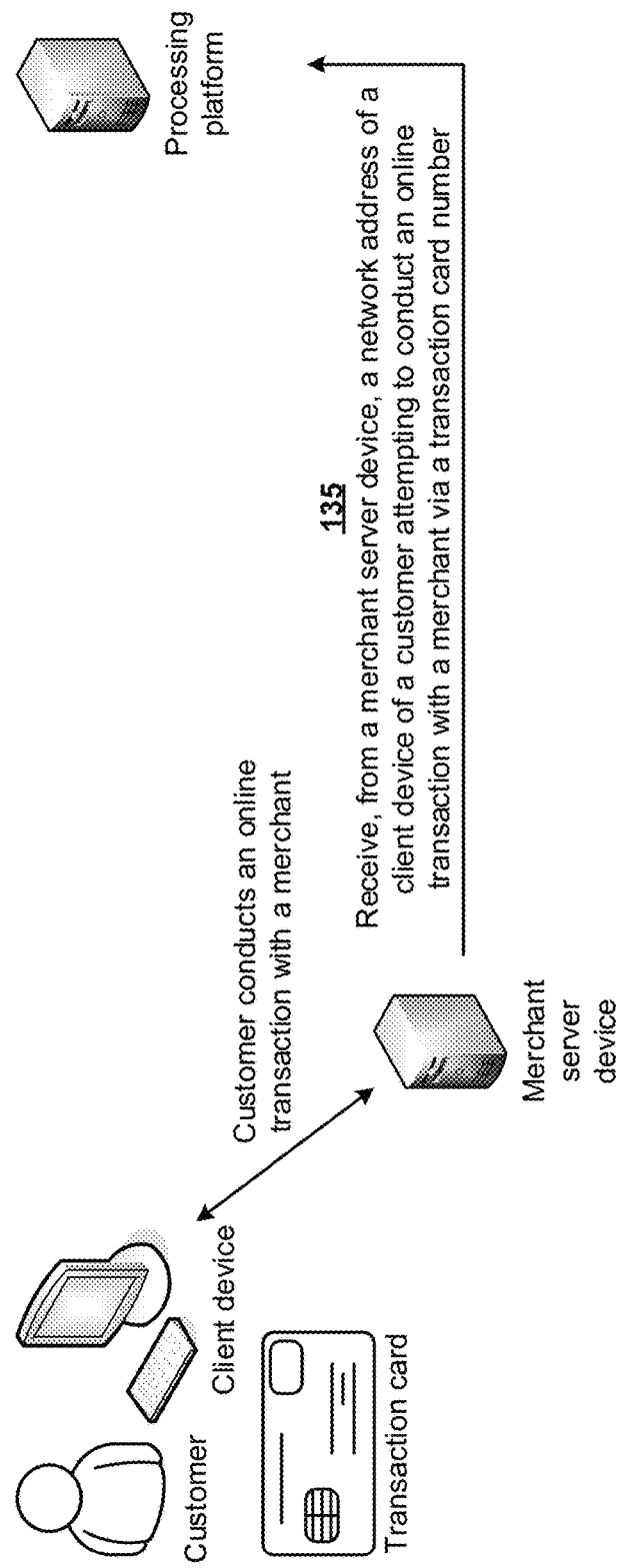

FIGS. 1F-1I relate to a different example. As shown in FIG. 1F, and by reference number 135, the processing platform may receive, from a merchant server device, a network address of a client device of a customer attempting to conduct an online transaction with a merchant via a transaction card number. This may be similar to what was described in relation to FIG. 1A. The network address may be an identifier for a node or host on a telecommunications network. For example, the network address may include an IP address, such as an IPv4 address, IPv6 address, and/or the like. The network address may be used to identify a location associated with the client device.

Figure 1G:
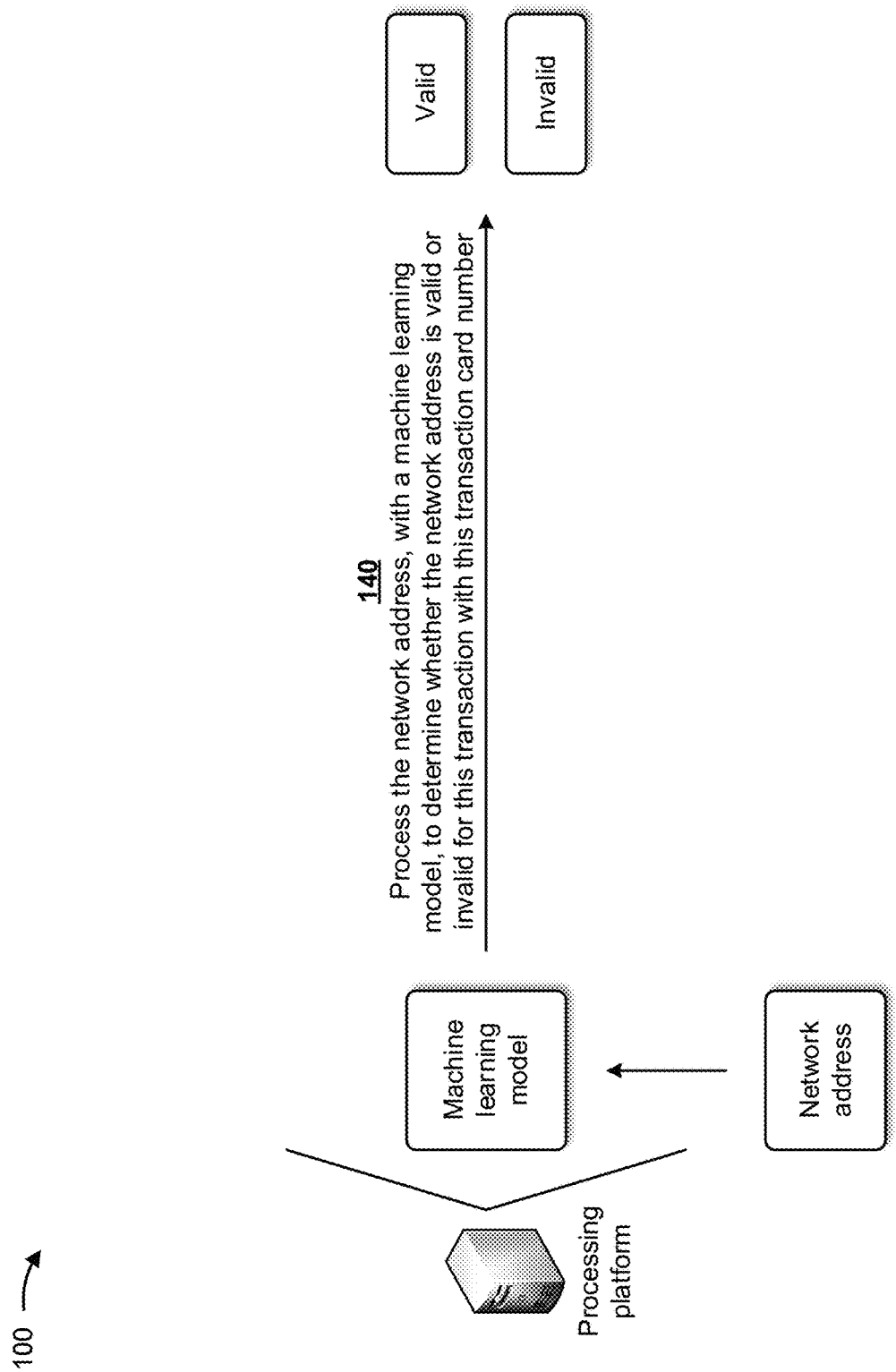

As shown in FIG. 1G, and by reference number 140, the processing platform may process the network address, with a machine learning model, to determine whether the network address is valid or invalid for this transaction with this transaction card number. For example, the processing platform may determine whether the network address is indicative of fraud (e.g., a network address similar to a network address associated with fraud), whether network address is associated with a location indicative of fraud, and/or the like. For example, the processing platform may process the network address in a way similar to what was described in relation to FIG. 1C.

Figure 1H:
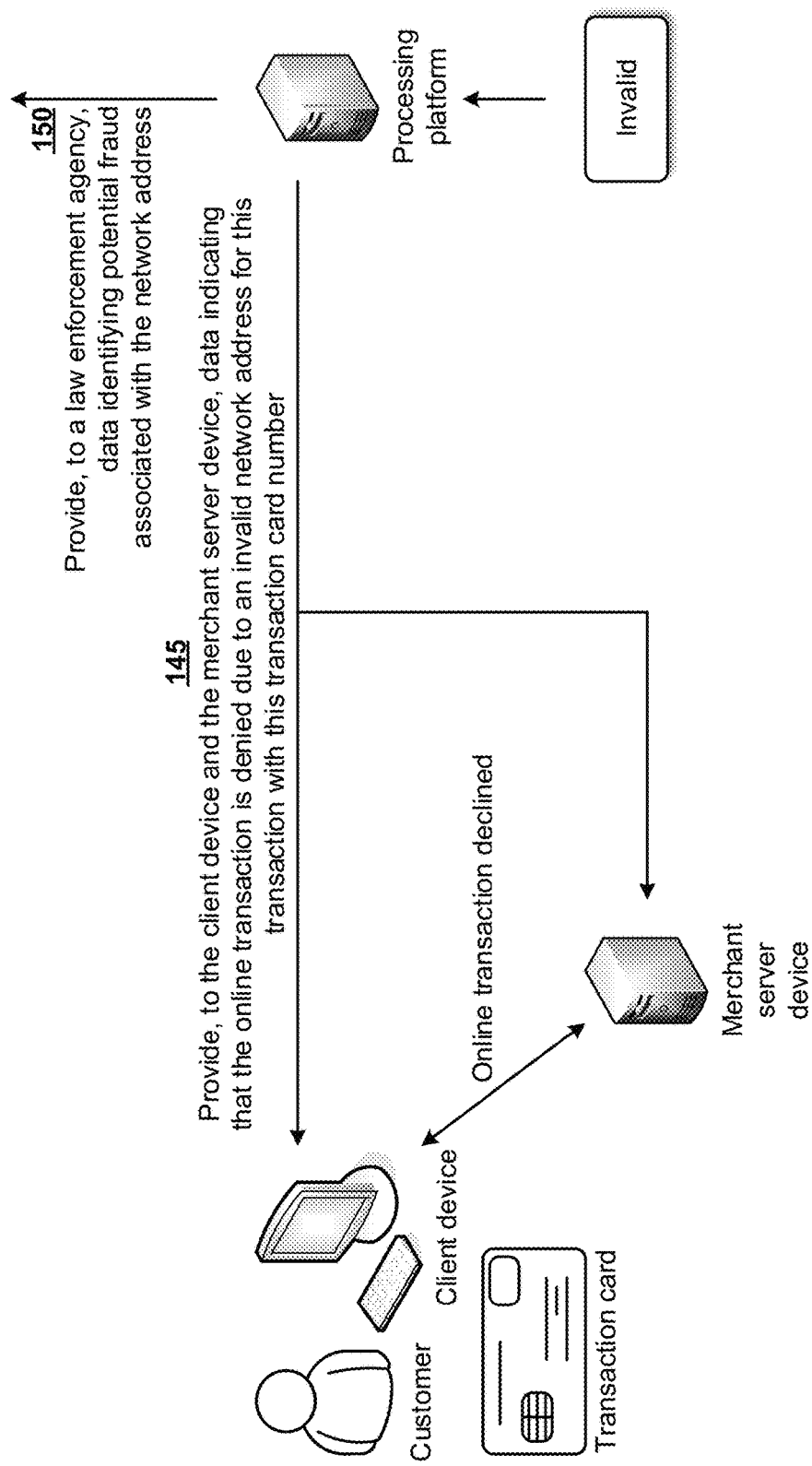

As shown in FIG. 1H, and by reference number 145, the processing platform may provide, to the client device and/or the merchant server device, data indicating that the online transaction is denied due to an invalid network address for this transaction with this transaction card number. The merchant server device may determine to end the transaction. In some implementations, the client device may show a notification to the customer that the transaction was denied. As further shown in FIG. 1H, and by reference number 150, the processing platform may provide, to a law enforcement agency, data identifying potential fraud associated with the transaction card number and/or the network address. The information sent to the law enforcement agency may contain various information about the transaction. For example, information about the transaction may include information concerning a date the transaction was made, a time the transaction was made, and/or the like. In some implementations, the data may also include information determining a likelihood of fraud associated with the transaction card number, how many potential fraud attempts are associated with the transaction card number, and/or the like.

Figure 1I:
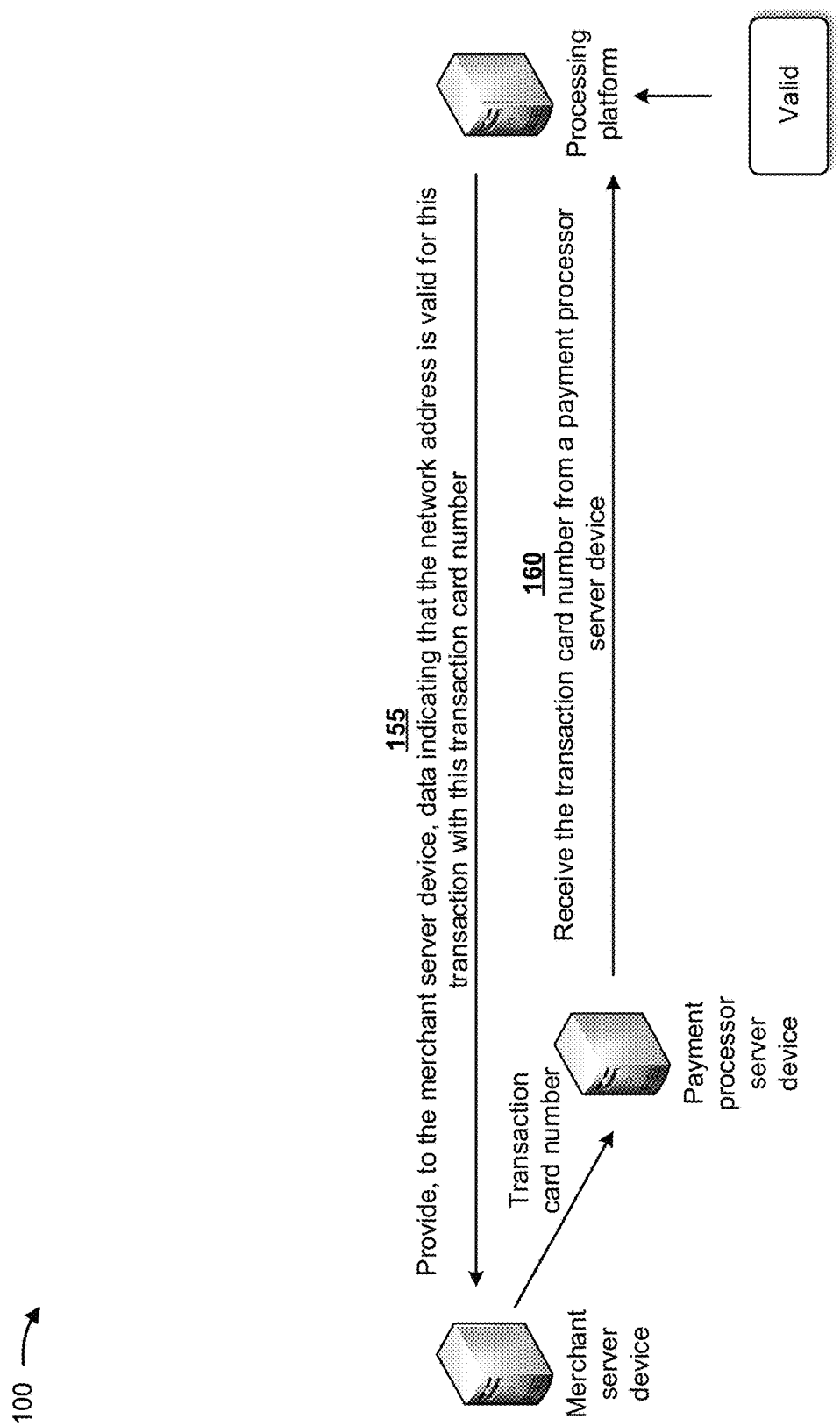

As shown in FIG. 1I, and by reference number 155, the processing platform may provide, to the merchant server device, data indicating that the network address is valid based on the processing platform determining that the network address is valid for this transaction with this transaction card number. Based on this, the merchant server device may determine to continue the transaction. For example, the merchant server device may then provide the transaction card number and other information needed to process the transaction (e.g., a dollar amount of the transaction) to a payment processor server device. As further shown in FIG. 1I, and by reference number 160, the processing platform may receive the transaction card number from the payment processor server device. The processing platform may perform actions to determine whether to authenticate the transaction card number and thus enable the transaction.

Figure 1J:
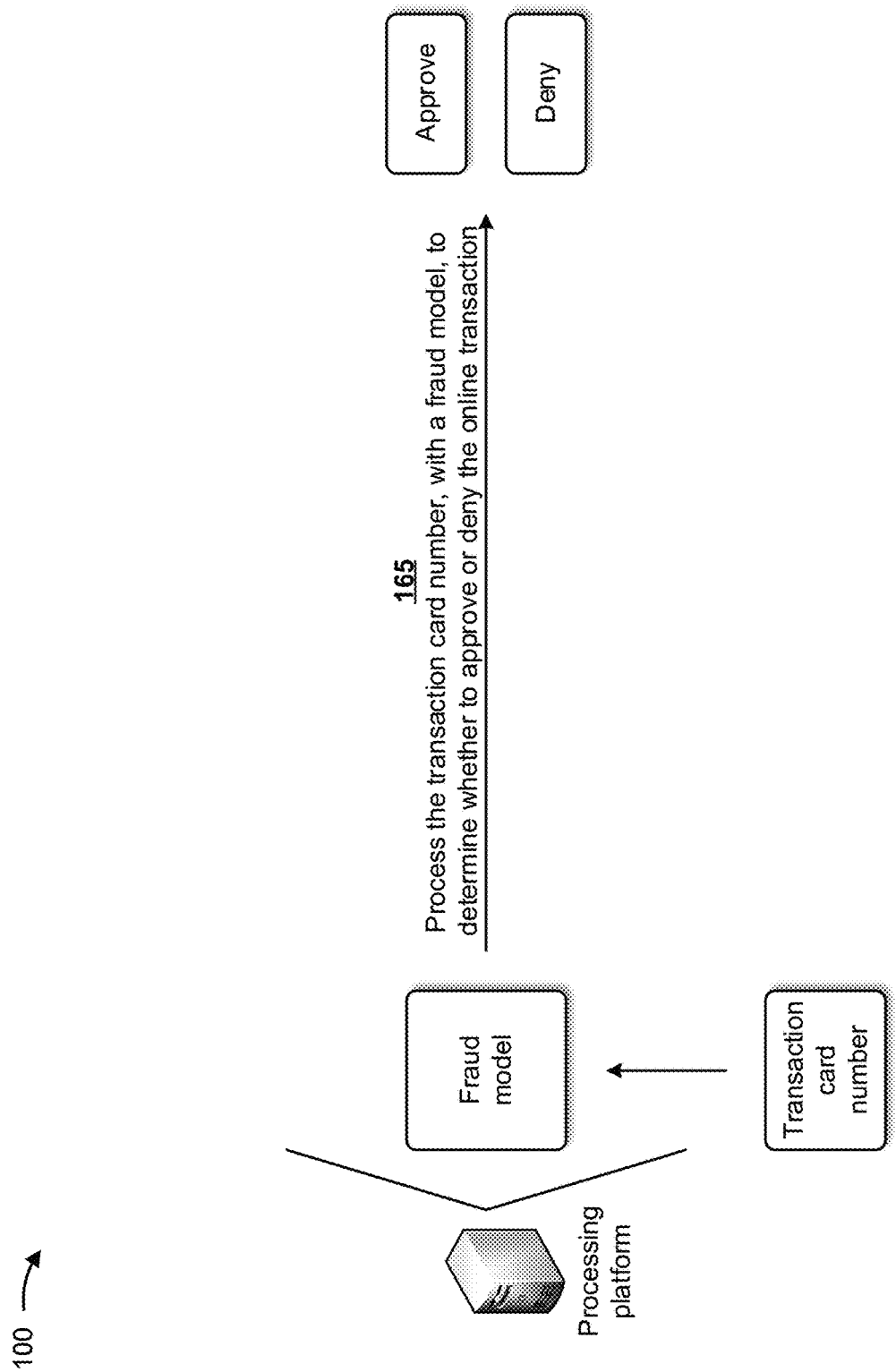

As shown in FIG. 1J, and by reference number 165, the processing platform may process that transaction card number, with a fraud model, to determine whether to approve or deny the online transaction. For example, the processing platform may use a fraud model, such as one similar to that described in FIG. 1C, to determine whether to approve or deny the transaction. In some implementations, the processing platform identifies a previous determination that the network address was valid when determining whether to approve or deny the online transaction.

Figure 1K:
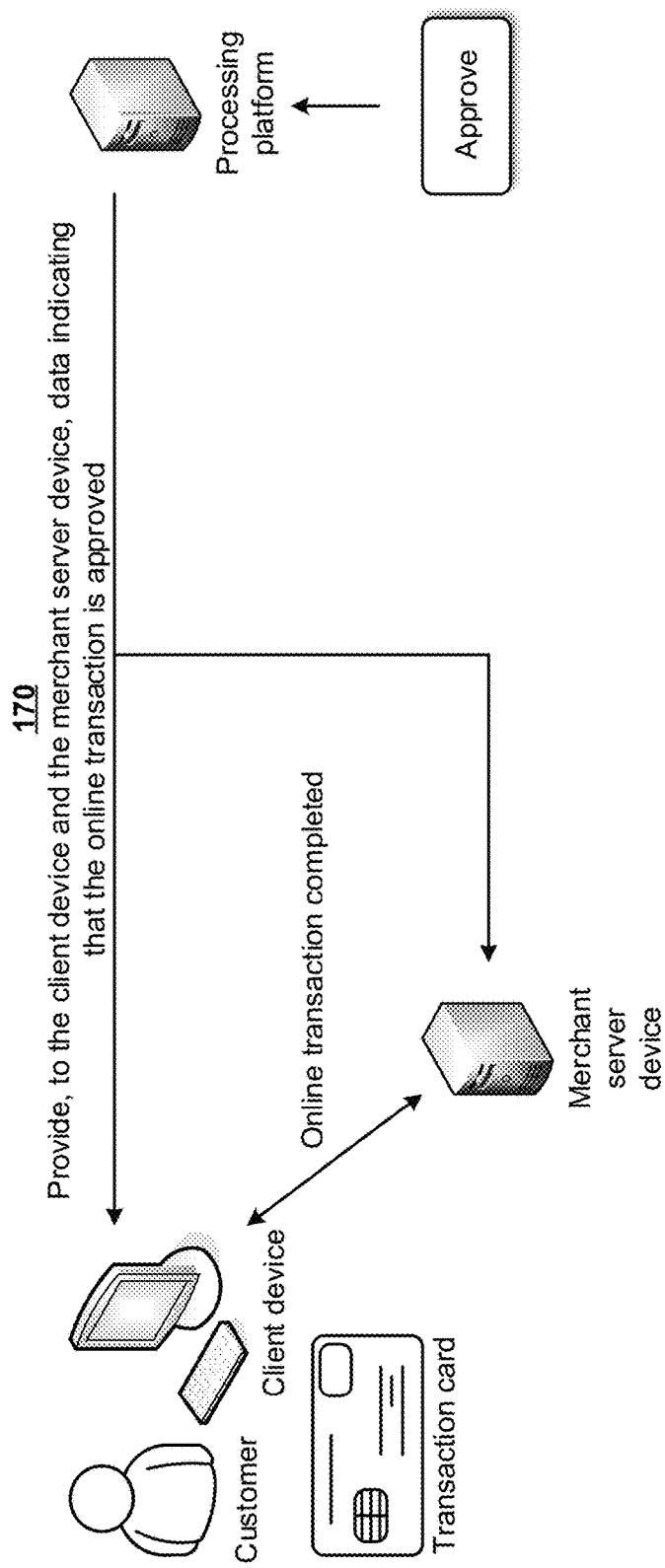

As shown in FIG. 1K, and by reference number 170, the processing platform may provide, to the client device and/or the merchant server device, data indicating that the online transaction is approved. The merchant server device may perform one or more actions based on determining that the online transaction is approved. For example, the merchant server device may provide notification, to the client device, that the online transaction is approved. The client device may display the notification, indicating that the online transaction has been completed successfully.

Figure 1L:
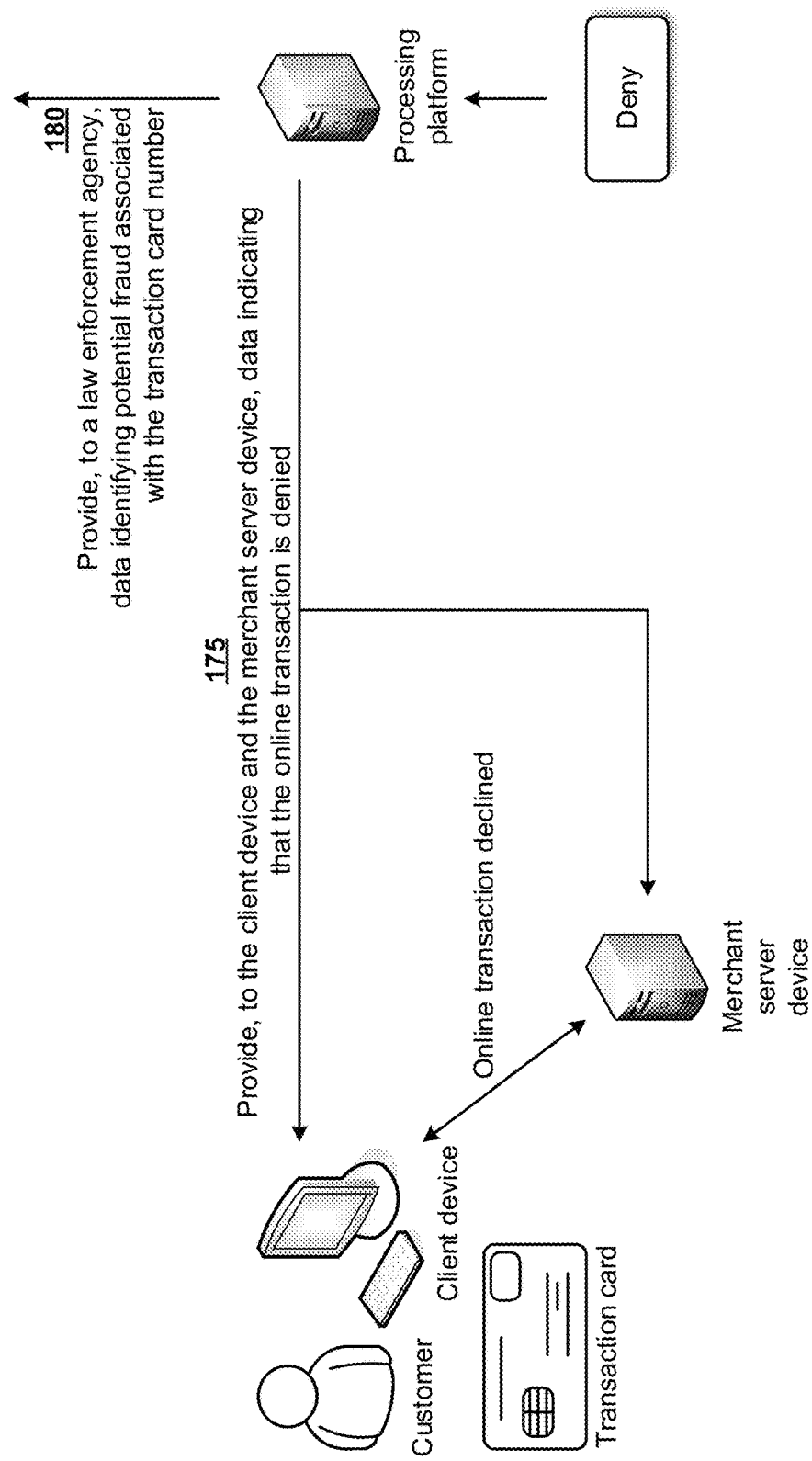

As shown in FIG. 1L, and by reference number 175, the processing platform may provide, to the client device and/or the merchant server device, data indicating that the online transaction is denied based on the processing platform determining that the transaction card number is invalid for this transaction with this transaction card number. The merchant server device may perform various actions based on determining that the online transaction is denied. For example, the merchant server device may determine to update a system based on determining that the online transaction is denied (e.g., from a "pending" status to a "declined status," and/or the like). In some implementations, the client device may display a notification that the online transaction is denied such that the customer receives notification that the online transaction has not been completed successfully.

As further shown in FIG. 1L, and by reference number 180, the processing platform may provide, to a law enforcement agency, data identifying potential fraud associated with the transaction card number. In some implementations, the data may additionally include information about the transaction, such as what time the transaction occurred, what date the transaction occurred, a merchant associated with the transaction, and/or the like. In some implementations, the data may also include information determining a likelihood of fraud associated with the transaction card number, how many potential fraud attempts are associated with the transaction card number, and/or the like.

In this way, several different stages of the process for validating online transactions with transaction cards are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and network addresses to validate online transactions with transaction cards in the manner described herein. Finally, the process for utilizing machine learning and network addresses to validate online transactions with transaction cards conserves computing resources, networking resources, and/or the like that would otherwise have been wasted in attempting to validate online transactions, handling claims associated with fraudulent online transactions, paying for money lost due to fraudulent online transactions, and/or like.

As indicated above, FIGS. 1A-1L are provided merely as examples. Other examples may differ from what is described with regard to FIGS. 1A-1L.

Figure 2:
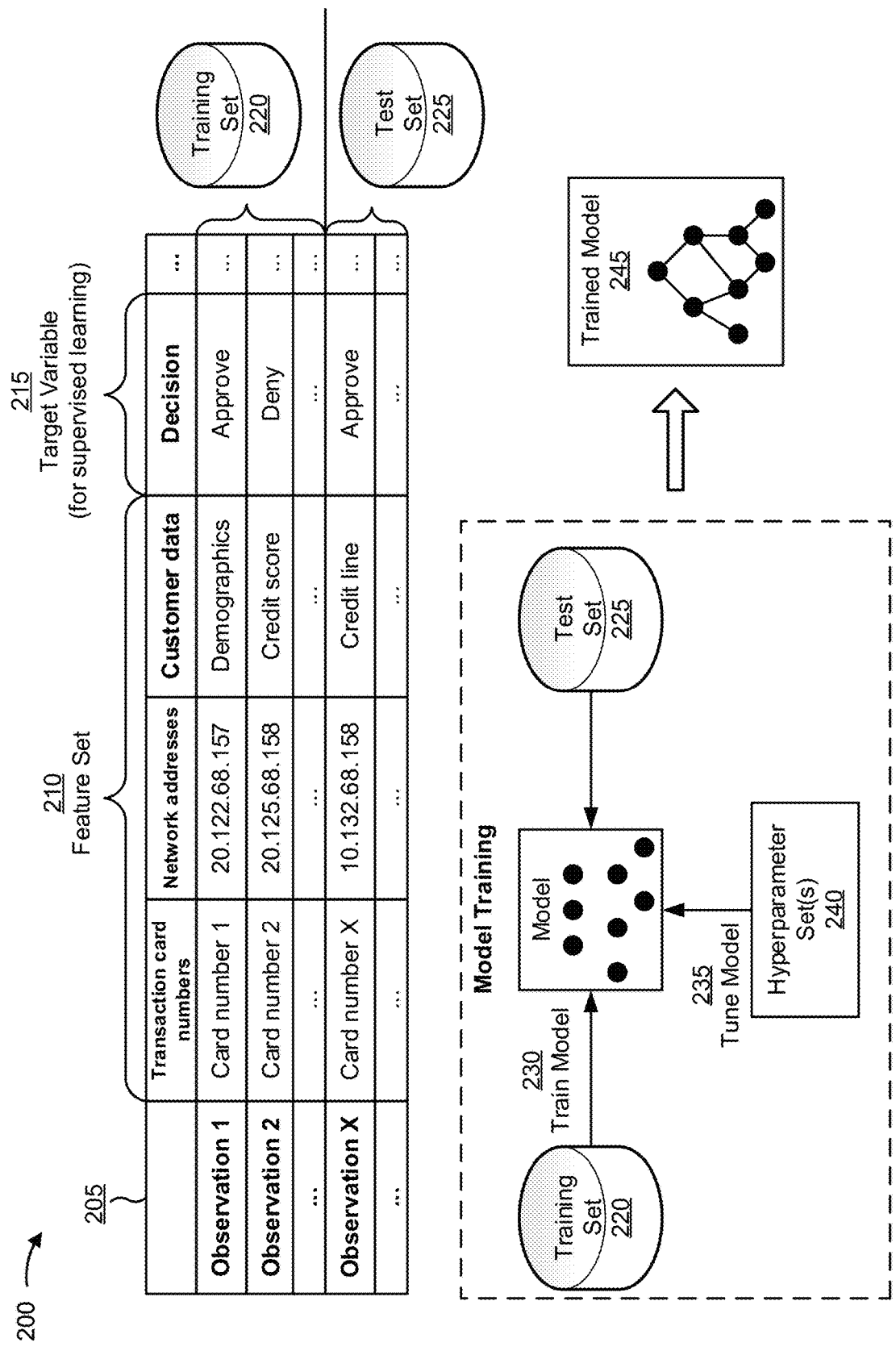
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the processing platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the client device, as described elsewhere herein. In some implementations, the machine learning system may receive the set of observations (e.g., as input) from the client device.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the client device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of transaction card numbers, a second feature of network addresses, a third feature of customer data, and so on. As shown, for a first observation, the first feature may have a value of a first card number (e.g., card number 1), the second feature may have a value of 20.122.68.157, the third feature may have a value of demographics, and so on. These features and feature values are provided as examples, and may differ in other examples. For example, the feature set may include one or more of the following features: transaction card numbers (e.g., numbers associated with credit cards, debit cards, rewards cards, prepaid cards, and/or the like of customers); network addresses (e.g., IP addresses, media access control (MAC) addresses, and/or the like associated with client devices); customer data (e.g., demographics, ages, credit scores, credit lines, and/or the like of customers); and/or the like. In some implementations, the machine learning system may preprocess and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
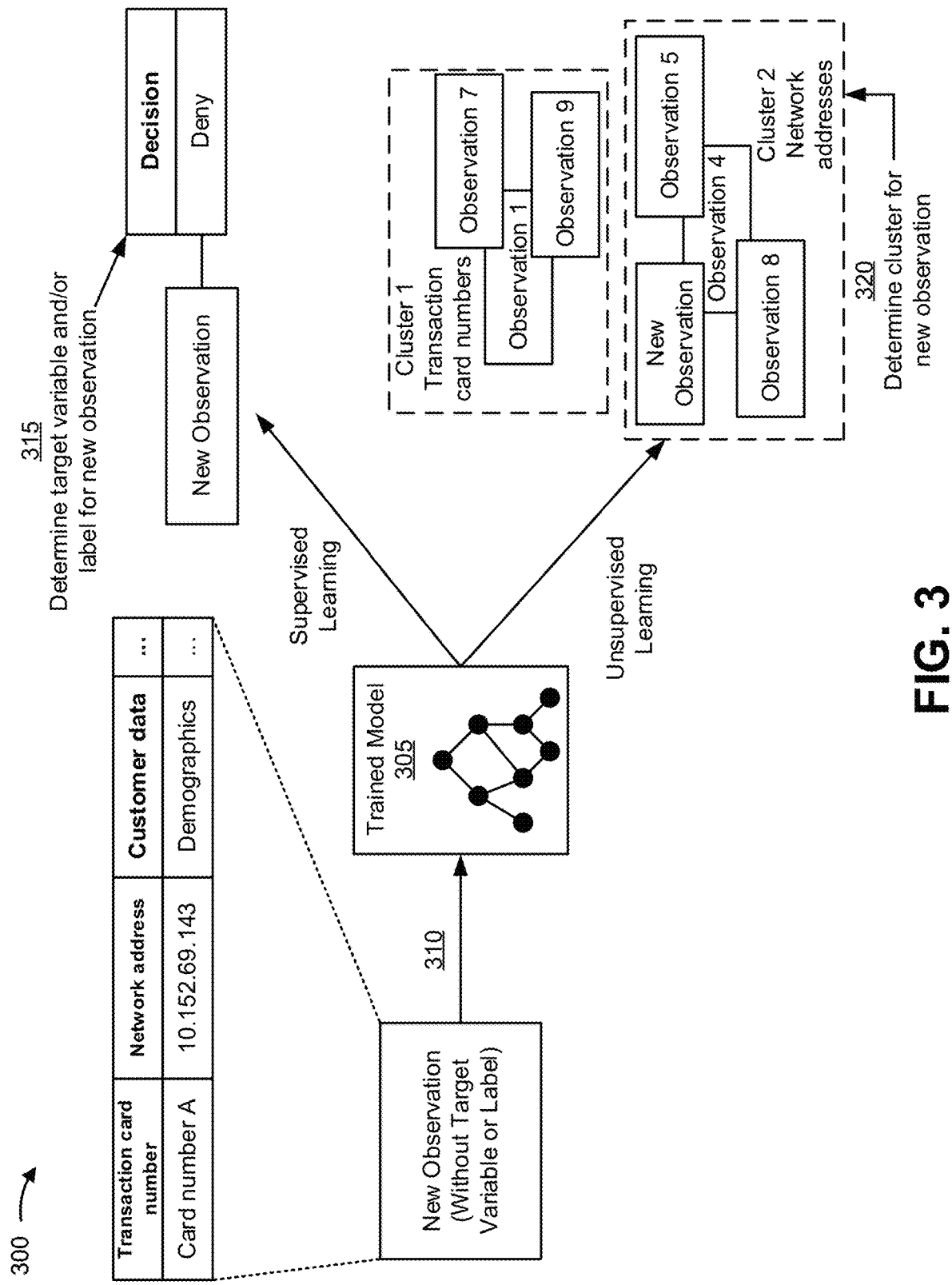
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the processing platform.

As shown by reference number 310, the machine learning system may receive a new observation (or a set of new observations), and may input the new observation to the machine learning model 305. As shown, the new observation may include a first feature of "card number A," a second feature of "10.152.69.143," a third feature of demographics, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of "deny" for the target variable of "decision" for the new observation, as shown by reference number 315. Based on this prediction (e.g., based on the value having a particular label/classification, based on the value satisfying or failing to satisfy a threshold, and/or the like), the machine learning system may provide a recommendation, such as a merchant should deny an online transaction. Additionally, or alternatively, the machine learning system may perform an automated action and/or may cause an automated action to be performed (e.g., by instructing another device to perform the automated action), such as denying the online transaction with the merchant. As another example, if the machine learning system were to predict a value of "approve" for the target variable of "decision," then the machine learning system may provide a different recommendation (e.g., a merchant should approve an online transaction) and/or may perform or cause performance of a different automated action (e.g., generating data indicating approval of the online transaction). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like).

In some implementations, the trained machine learning model 305 may classify (e.g., cluster) the new observation in a transaction card numbers cluster, as shown by reference number 320. The observations within a cluster may have a threshold degree of similarity. Based on classifying the new observation in the transaction card numbers cluster, the machine learning system may provide a recommendation, such as the merchant should deny card number A for the online transaction. Additionally, or alternatively, the machine learning system may perform an automated action and/or may cause an automated action to be performed (e.g., by instructing another device to perform the automated action), such as denying the online transaction with card number A. As another example, if the machine learning system were to classify the new observation in a network addresses cluster, then the machine learning system may provide a different recommendation (e.g., approve the online transaction with card number A) and/or may perform or cause performance of a different automated action (e.g., providing data indicating that the online transaction with card number A is approved).

In this way, the machine learning system may apply a rigorous and automated process to validating online transactions with transaction cards. The machine learning system enables recognition and/or identification of tens, hundreds, thousands, or millions of features and/or feature values for tens, hundreds, thousands, or millions of observations, thereby increasing an accuracy and consistency of validating online transactions with transaction cards relative to requiring computing resources to be allocated for tens, hundreds, or thousands of operators to manually validating online transactions with transaction cards using the features or feature values.

As indicated above, FIG. 3 is provided as an example. Other examples may differ from what is described in connection with FIG. 3.

Figure 4:
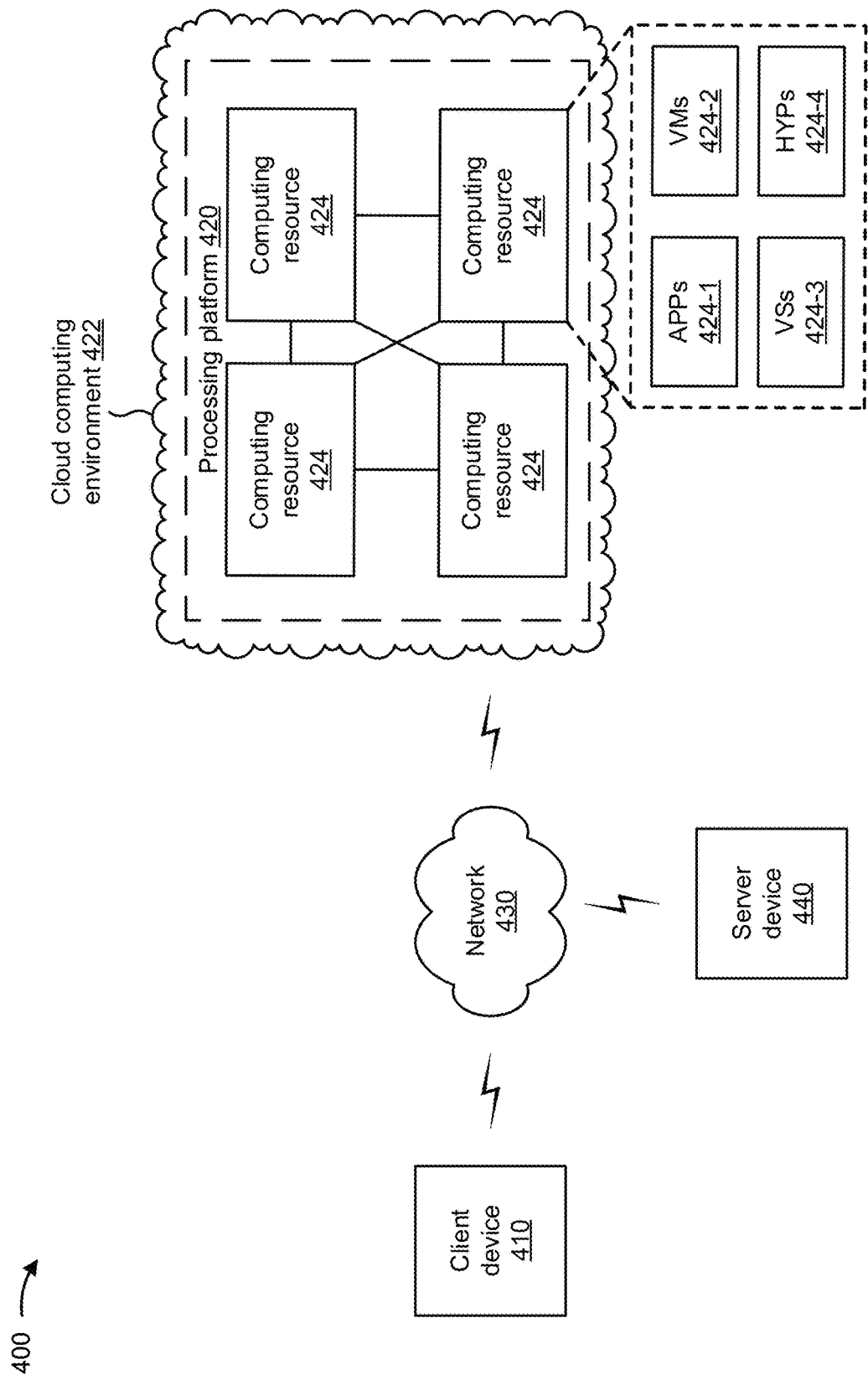
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a processing platform 420, a network 430, and a server device 440. Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 410 may receive information from and/or transmit information to processing platform 420.

Processing platform 420 includes one or more devices that utilize machine learning and network addresses to validate online transactions with transaction cards. In some implementations, processing platform 420 may be designed to be modular such that certain software components may be swapped in or out depending on a particular need. As such, processing platform 420 may be easily and/or quickly reconfigured for different uses. In some implementations, processing platform 420 may receive information from and/or transmit information to one or more client devices 410.

In some implementations, as shown, processing platform 420 may be hosted in a cloud computing environment 422. Notably, while implementations described herein describe processing platform 420 as being hosted in cloud computing environment 422, in some implementations, processing platform 420 may not be cloud-based (i.e., may be implemented outside of a cloud computing environment) or may be partially cloud-based.

Cloud computing environment 422 includes an environment that hosts processing platform 420. Cloud computing environment 422 may provide computation, software, data access, storage, etc., services that do not require end-user knowledge of a physical location and configuration of system(s) and/or device(s) that hosts processing platform 420. As shown, cloud computing environment 422 may include a group of computing resources 424 (referred to collectively as "computing resources 424" and individually as "computing resource 424").

Computing resource 424 includes one or more personal computers, workstation computers, mainframe devices, or other types of computation and/or communication devices. In some implementations, computing resource 424 may host processing platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with processing platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program and may support a single process. In some implementations, virtual machine 424-2 may execute on behalf of a user (e.g., a user of client device 410 or an operator of processing platform 420), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 440 includes one or more devices capable of receiving, generating, storing, processing, and/or providing information, such as information described herein. For example, server device 440 may include a laptop computer, a tablet computer, a desktop computer, a group of server devices, or a similar type of device. In some implementations, server device 440 may receive information from and/or transmit information to client device 410 and/or processing platform 420.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
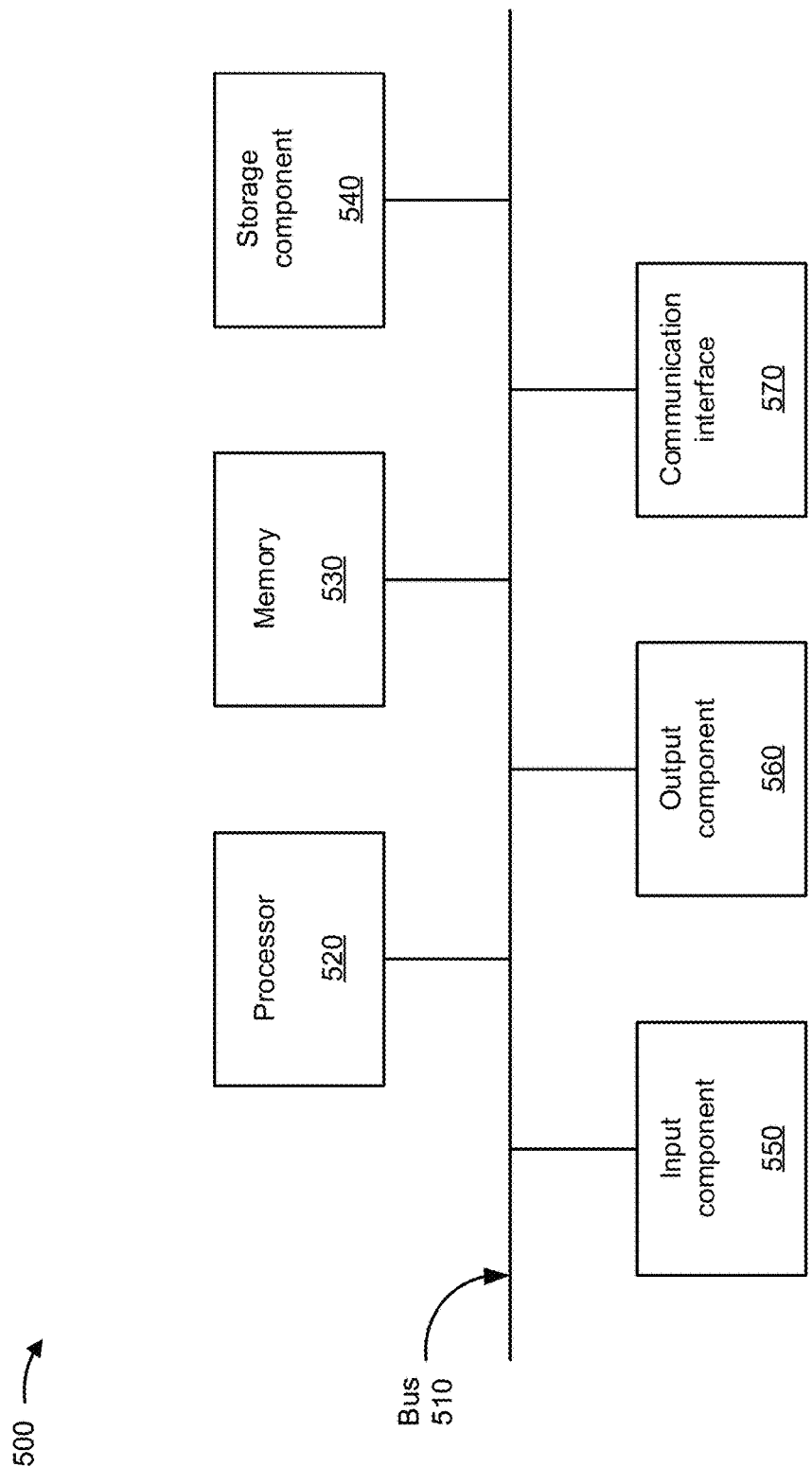
FIG. 5 is a diagram of example components of one or more devices of FIG. 4.

FIG. 5 is a diagram of example components of a device 500. Device 500 may correspond to client device 410, processing platform 420, computing resource 424, and/or server device 440. In some implementations, client device 410, processing platform 420, computing resource 424, and/or server device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
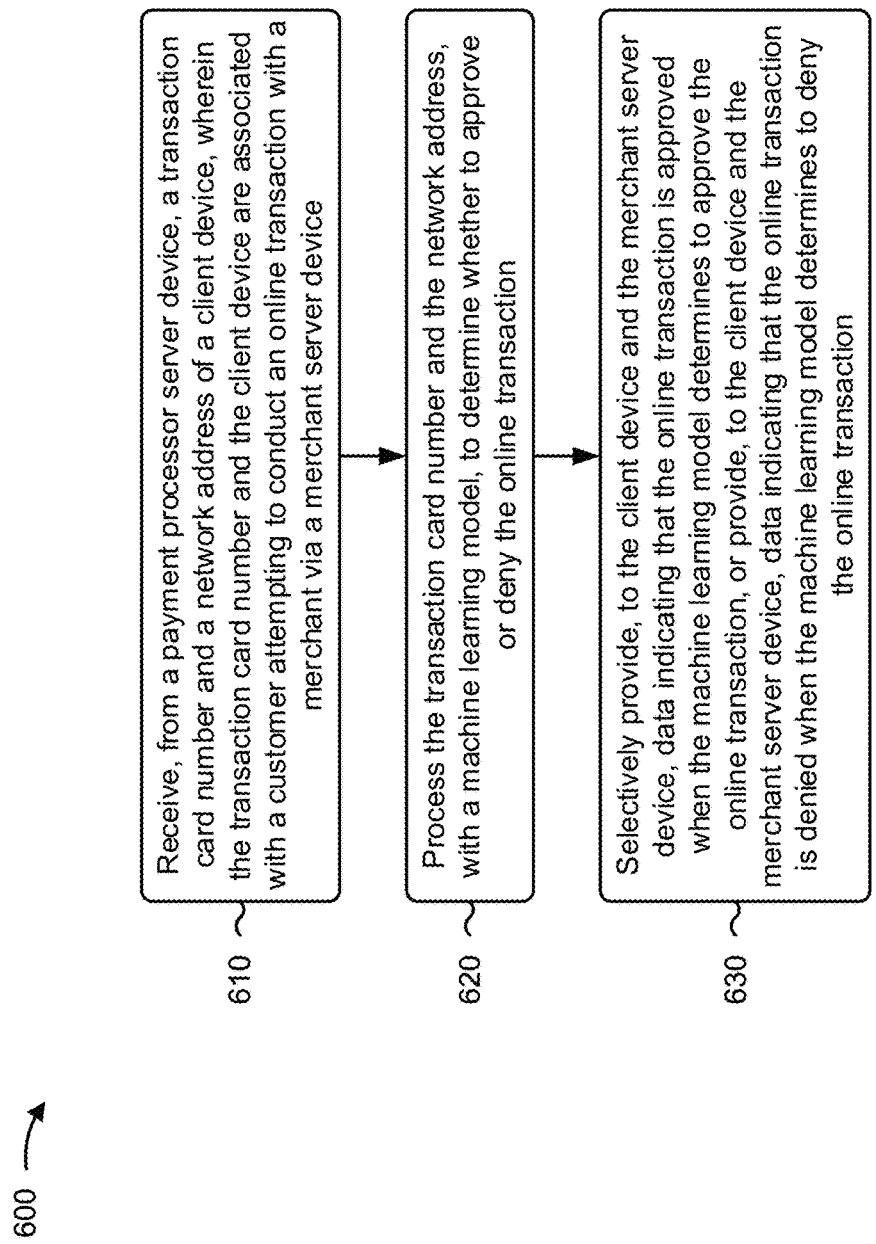

FIG. 6 is a flow chart of an example process 600 for utilizing machine learning and network addresses to validate online transactions with transaction cards. In some implementations, one or more process blocks of FIG. 6 may be performed by a device (e.g., processing platform 420). In some implementations, one or more process blocks of FIG. 6 may be performed by another device or a group of devices separate from or including the device, such as a server device (e.g., server device 440).

As shown in FIG. 6, process 600 may include receiving, from a payment processor server device, a transaction card number and a network address of a client device, wherein the transaction card number and the client device are associated with a customer attempting to conduct an online transaction with a merchant via a merchant server device (block 610). For example, the device (e.g., using computing resource 424, processor 520, communication interface 570, and/or the like) may receive, from a payment processor server device, a transaction card number and a network address of a client device, as described above. In some implementations, the transaction card number and the client device may be associated with a customer attempting to conduct an online transaction with a merchant via a merchant server device.

As further shown in FIG. 6, process 600 may include processing the transaction card number and the network address, with a machine learning model, to determine whether to approve or deny the online transaction (block 620). For example, the device (e.g., using computing resource 424, processor 520, memory 530, and/or the like) may process the transaction card number and the network address, with a machine learning model, to determine whether to approve or deny the online transaction, as described above.

As further shown in FIG. 6, process 600 may include selectively providing, to the client device and the merchant server device, data indicating that the online transaction is approved when the machine learning model determines to approve the online transaction; or providing, to the client device and the merchant server device, data indicating that the online transaction is denied when the machine learning model determines to deny the online transaction (block 630). For example, the device (e.g., using computing resource 424, processor 520, memory 530, storage component 540, communication interface 570, and/or the like) may selectively provide, to the client device and the merchant server device, data indicating that the online transaction is approved when the machine learning model determines to approve the online transaction, or provide, to the client device and the merchant server device, data indicating that the online transaction is denied when the machine learning model determines to deny the online transaction, as described above.

Process 600 may include additional implementations, such as any single implementation or any combination of implementations described below and/or in connection with one or more other processes described elsewhere herein.

In a first implementation, process 600 may include providing, to a server device associated with a law enforcement agency, data identifying potential fraud associated with the transaction card number or the network address when the machine learning model determines to deny the online transaction.

In a second implementation, alone or in combination with the first implementation, process 600 may include determining a geographical location of the network address, and processing the transaction card number and the network address, with the machine learning model, to determine whether to approve or deny the online transaction may include processing data identifying the geographical location of the network address, the transaction card number, and the network address, with the machine learning model, to determine whether to approve or deny the online transaction.

In a third implementation, alone or in combination with one or more of the first and second implementations, processing the transaction card number and the network address, with the machine learning model, to determine whether to approve or deny the online transaction may include comparing the network address to a plurality of classless inter-domain routing ranges associated with the customer to determine whether to approve or deny the online transaction.

In a fourth implementation, alone or in combination with one or more of the first through third implementations, process 600 may include approving the online transaction when the network address is provided in one of the plurality of classless inter-domain routing ranges associated with the customer; or denying the online transaction when the network address is not provided in one of the plurality of classless inter-domain routing ranges associated with the customer.

In a fifth implementation, alone or in combination with one or more of the first through fourth implementations, the machine learning model may include a linear classifier model, a logistic regression model, a nearest neighbor model, a support vector machine model, a decision tree model, a random forest model, or a neural network model.

In a sixth implementation, alone or in combination with one or more of the first through fifth implementations, a transaction card associated with the transaction card number may include a credit card, a debit card, a gift card, a payment card, an automated teller machine card, a stored-value card, or a fleet card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
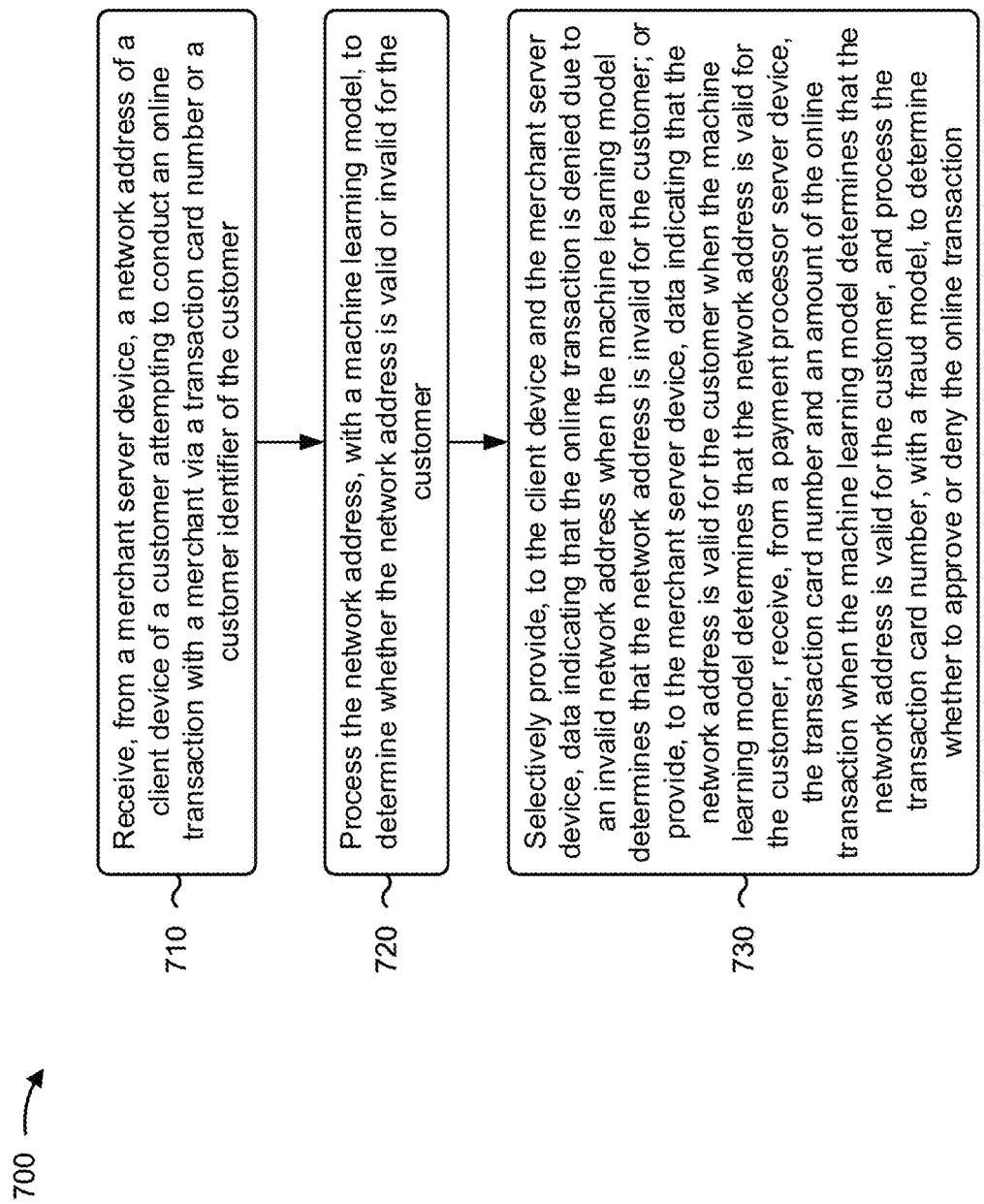

FIG. 7 is a flow chart of an example process 700 for utilizing machine learning and network addresses to validate online transactions with transaction cards. In some implementations, one or more process blocks of FIG. 7 may be performed by a device (e.g., processing platform 420). In some implementations, one or more process blocks of FIG. 7 may be performed by another device or a group of devices separate from or including the device, such as a server device (e.g., server device 440).

As shown in FIG. 7, process 700 may include receiving, from a merchant server device, a network address of a client device of a customer attempting to conduct an online transaction with a merchant via a transaction card number or a customer identifier of the customer (block 710). For example, the device (e.g., using computing resource 424, processor 520, communication interface 570, and/or the like) may receive, from a merchant server device, a network address of a client device of a customer attempting to conduct an online transaction with a merchant via a transaction card number or a customer identifier of the customer, as described above.

As further shown in FIG. 7, process 700 may include processing the network address, with a machine learning model, to determine whether the network address is valid or invalid for the customer (block 720). For example, the device (e.g., using computing resource 424, processor 520, memory 530, and/or the like) may process the network address, with a machine learning model, to determine whether the network address is valid or invalid for the customer, as described above.

As further shown in FIG. 7, process 700 may include selectively providing, to the client device and the merchant server device, data indicating that the online transaction is denied due to an invalid network address when the machine learning model determines that the network address is invalid for the customer; or providing, to the merchant server device, data indicating that the network address is valid for the customer when the machine learning model determines that the network address is valid for the customer, receiving, from a payment processor server device, the transaction card number and an amount associated with the online transaction when the machine learning model determines that the network address is valid for the customer, and processing the transaction card number, with a fraud model, to determine whether to approve or deny the online transaction (block 730). For example, the device (e.g., using computing resource 424, processor 520, memory 530, storage component 540, input component 550, output component 560, communication interface 570, and/or the like) may selectively provide, to the client device and the merchant server device, data indicating that the online transaction is denied due to an invalid network address when the machine learning model determines that the network address is invalid for the customer; or may provide, to the merchant server device, data indicating that the network address is valid for the customer when the machine learning model determines that the network address is valid for the customer, may receive, from a payment processor server device, the transaction card number when the machine learning model determines that the network address is valid for the customer, and may process the transaction card number, with a fraud model, to determine whether to approve or deny the online transaction, as described above.

Process 700 may include additional implementations, such as any single implementation or any combination of implementations described below and/or in connection with one or more other processes described elsewhere herein.

In a first implementation, process 700 may include providing, to the client device and the merchant server device, data indicating that the online transaction is approved when the fraud model determines that the online transaction is approved.

In a second implementation, alone or in combination with the first implementation, process 700 may include providing, to the client device and the merchant server device, data indicating that the online transaction is denied when the fraud model determines that the online transaction is denied.

In a third implementation, alone or in combination with one or more of the first and second implementations, process 700 may include providing, to a server device associated with a law enforcement agency, data identifying potential fraud associated with the network address when the online transaction is denied due to an invalid network address.

In a fourth implementation, alone or in combination with one or more of the first through third implementations, process 700 may include comparing the network address to a plurality of classless inter-domain routing ranges associated with the customer to determine whether the network address is valid or invalid for the customer.

In a fifth implementation, alone or in combination with one or more of the first through fourth implementations, process 700 may include determining that the network address is valid for the customer when the network address is provided in one of the plurality of classless inter-domain routing ranges associated with the customer; or determining that the network address invalid for the customer when the network address is not provided in one of the plurality of classless inter-domain routing ranges associated with the customer.

In a sixth implementation, alone or in combination with one or more of the first through fifth implementations, the network address may include an Internet protocol (IP) address of the client device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for utilizing machine learning and network addresses to validate online transactions with transaction cards. In some implementations, one or more process blocks of FIG. 8 may be performed by a device (e.g., processing platform 420). In some implementations, one or more process blocks of FIG. 8 may be performed by another device or a group of devices separate from or including the device, such as a server device (e.g., server device 440).

As shown in FIG. 8, process 800 may include receiving, from a payment processor server device, a transaction card number and a network address of a client device, wherein the transaction card number and the client device are associated with a customer attempting to conduct an online transaction with a merchant via a merchant server device (block 810). For example, the device (e.g., using computing resource 424, processor 520, communication interface 570, and/or the like) may receive, from a payment processor server device, a transaction card number and a network address of a client device, as described above. In some implementations, the transaction card number and the client device may be associated with a customer attempting to conduct an online transaction with a merchant via a merchant server device.

As further shown in FIG. 8, process 800 may include processing the transaction card number and the network address, with a machine learning model, to determine whether to approve or deny the online transaction, wherein the machine learning model has been trained based on historical transaction card numbers and historical network addresses associated with the customer (block 820). For example, the device (e.g., using computing resource 424, processor 520, memory 530, and/or the like) may process the transaction card number and the network address, with a machine learning model, to determine whether to approve or deny the online transaction, as described above. In some implementations, the machine learning model may have been trained based on historical transaction card numbers and historical network addresses associated with the customer.

As further shown in FIG. 8, process 800 may include selectively providing, to the client device and the merchant server device, data indicating that the online transaction is approved when the machine learning model determines to approve the online transaction; or providing, to the client device and the merchant server device, data indicating that the online transaction is denied when the machine learning model determines to deny the online transaction (block 830). For example, the device (e.g., using computing resource 424, processor 520, memory 530, storage component 540, input component 550, output component 560, communication interface 570, and/or the like) may selectively provide, to the client device and the merchant server device, data indicating that the online transaction is approved when the machine learning model determines to approve the online transaction; or provide, to the client device and the merchant server device, data indicating that the online transaction is denied when the machine learning model determines to deny the online transaction, as described above.

Process 800 may include additional implementations, such as any single implementation or any combination of implementations described below and/or in connection with one or more other processes described elsewhere herein.

In a first implementation, process 800 may include providing, to a server device associated with a law enforcement agency, data identifying potential fraud associated with the transaction card number or the network address when the machine learning model determines to deny the online transaction.

In a second implementation, alone or in combination with the first implementation, process 800 may include determining a geographical location of the network address, and processing the transaction card number and the network address, with the machine learning model, to determine whether to approve or deny the online transaction may include processing data identifying the geographical location of the network address, the transaction card number, and the network address, with the machine learning model, to determine whether to approve or deny the online transaction.

In a third implementation, alone or in combination with one or more of the first and second implementations, process 800 may include comparing the network address to a plurality of classless inter-domain routing ranges associated with the customer to determine whether to approve or deny the online transaction.

In a fourth implementation, alone or in combination with one or more of the first through third implementations, process 800 may include approving the online transaction when the network address is provided in one of the plurality of classless inter-domain routing ranges associated with the customer; or denying the online transaction when the network address is not provided in one of the plurality of classless inter-domain routing ranges associated with the customer.

In a fifth implementation, alone or in combination with one or more of the first through fourth implementations, the network address may include an Internet protocol (IP) address of the client device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a payment processor server device, a transaction card number and a network address of a client device,
wherein the transaction card number and the client device are associated with a customer attempting to conduct an online transaction with a merchant via a merchant server device;
training, by the device, a machine learning model to determine whether the customer is associated with a particular network address to generate a trained machine learning model,
wherein training the machine learning model comprises:
obtaining a set of observations including:
network addresses historically associated with the customer,
network addresses associated with financial institutions,
locations associated with the financial institutions, and
locations associated with the customer, partitioning the set of observations into a training set that includes a first subset of observations, of the set of observations, and a test set that includes a second subset of observations of the set of observations, performing dimensionality reduction to reduce the training set to a minimum feature set, executing a regularized regression algorithm to determine a regression coefficient based on the minimum feature set, using one or more hyperparameter sets to tune the machine learning model, wherein the one or more hyperparameter sets includes a strength of a penalty applied to the regression coefficient to mitigate overfitting of the machine learning model to the training set, generating a cross-validation score for each hyperparameter set of the one or more hyperparameter sets to generate cross-validation scores, selecting a hyperparameter set of the one or more hyperparameter sets based on comparing the cross-validation scores, training the machine learning model based on the hyperparameter set, testing the machine learning model using the test set to determine a performance score, and storing the machine learning model as the trained machine learning model based on the performance score meeting a threshold;

processing, using the trained machine learning model, the transaction card number and the network address to determine whether the customer is associated with the network address, wherein processing the transaction card number and the network address comprises:

determining, using the trained machine learning model, whether the customer uses virtual private network (VPN) services, and determining, based on determining whether the customer uses the VPN services, whether the customer is associated with the network address;

determining, based on using the trained machine learning model, whether to approve or deny the online transaction; and selectively:

providing, by the device and to the client device and the merchant server device, data indicating that the online transaction is approved when the machine learning model determines to approve the online transaction, or providing, by the device and to the client device and the merchant server device, data indicating that the online transaction is denied when the machine learning model determines to deny the online transaction.

2. The method of claim 1, further comprising:

providing, to a server device associated with a law enforcement agency, data identifying potential fraud associated with the transaction card number or the network address when the machine learning model determines to deny the online transaction.

3. The method of claim 1, further comprising:

determining a geographical location of the network address, wherein processing the transaction card number and the network address, with the machine learning model, to determine whether to approve or deny the online transaction comprises:

processing data identifying the geographical location of the network address, the transaction card number, and the network address, with the machine learning model, to determine whether to approve or deny the online transaction.

4. The method of claim 1, wherein processing the transaction card number and the network address, with the machine learning model, to determine whether to approve or deny the online transaction comprises:

comparing the network address to a plurality of classless inter-domain routing ranges associated with the customer to determine whether to approve or deny the online transaction.

5. The method of claim 4, further comprising one of:

approving the online transaction when the network address is provided in one of the plurality of classless inter-domain routing ranges associated with the customer; or denying the online transaction when the network address is not provided in one of the plurality of classless inter-domain routing ranges associated with the customer.

6. The method of claim 1, wherein the machine learning model includes one or more of:

a linear classifier model,
a logistic regression model,
a nearest neighbor model,
a support vector machine model,
a decision tree model,
a random forest model, or
a neural network model.

7. The method of claim 1, wherein a transaction card associated with the transaction card number includes one or more of:

a credit card,
a debit card,
a gift card,
a payment card,
an automated teller machine card,
a stored-value card, or
a fleet card.

8. A device, comprising:

one or more memories; and one or more processors, communicatively coupled to the one or more memories, configured to:

receive, from a merchant server device, a network address of a client device of a customer attempting to conduct an online transaction with a merchant via a transaction card number or a customer identifier of the customer;

train a machine learning model to determine whether the customer is associated with a particular network address to generate a trained machine learning model, wherein the one or more processors, to train the machine learning model are configured to:

obtain a set of observations including:

network addresses historically associated with the customer, network addresses associated with financial institutions,
locations associated with the financial institutions, and
locations associated with the customer, and
partition the set of observations into a training set that includes a first subset of observations, of the set of observations, and a test set that includes a second subset of observations of the set of observations,
execute a regularized regression algorithm to determine a regression coefficient based on the training set,
use one or more hyperparameter sets to tune the machine learning model,
wherein the one or more hyperparameter sets includes a strength of a penalty applied to the regression coefficient to mitigate overfitting of the machine learning model to the training set,
generate a cross-validation score for each hyperparameter set of the one or more hyperparameter sets to generate cross-validation scores,
select a hyperparameter set of the one or more hyperparameter sets based on comparing the cross-validation scores,
train the machine learning model based on the hyperparameter set,
test the machine learning model using the test set to determine a performance score, and
store the machine learning model based on the performance score meeting a threshold;
process the network address, with the machine learning model, to determine whether the network address is valid or invalid for the customer,
wherein the one or more processors, to process the network address, are configured to:
determine, using the trained machine learning model, whether the customer uses virtual private network (VPN) services, and
determine, based on determining whether the customer uses the VPN services, whether the network is valid or invalid for the customer; and
selectively:
provide, to the client device and the merchant server device, data indicating that the online transaction is denied due to an invalid network address when the machine learning model determines that the network address is invalid for the customer; or
provide, to the merchant server device, data indicating that the network address is valid for the customer when the machine learning model determines that the network address is valid for the customer,
receive, from a payment processor server device, the transaction card number when the machine learning model determines that the network address is valid for the customer, and
process the transaction card number, with a fraud model, to determine whether to approve or deny the online transaction.

9. The device of claim 8, wherein the one or more processors are further configured to:
provide, to the client device and the merchant server device, data indicating that the online transaction is approved when the fraud model determines that the online transaction is approved.

10. The device of claim 8, wherein the one or more processors are further configured to:
provide, to the client device and the merchant server device, data indicating that the online transaction is denied when the fraud model determines that the online transaction is denied.

11. The device of claim 8, wherein the one or more processors are further configured to:
provide, to a server device associated with a law enforcement agency, data identifying potential fraud associated with the network address when the online transaction is denied due to the invalid network address.

12. The device of claim 8, wherein the one or more processors, when processing the network address, with the machine learning model, to determine whether to approve or deny the online transaction, are configured to:
compare the network address to a plurality of classless inter-domain routing ranges associated with the customer to determine whether the network address is valid or invalid for the customer.

13. The device of claim 12, wherein the one or more processors are further configured to one of:
determine that the network address is valid for the customer when the network address is provided in one of the plurality of classless inter-domain routing ranges associated with the customer; or
determine that the network address is invalid for the customer when the network address is not provided in one of the plurality of classless inter-domain routing ranges associated with the customer.

14. The device of claim 8, wherein the network address includes an Internet protocol (IP) address of the client device.

15. A non-transitory computer-readable medium storing instructions, the instructions comprising:
one or more instructions that, when executed by one or more processors, cause the one or more processors to:
receive, from a payment processor server device, a transaction card number and a network address of a client device,
wherein the transaction card number and the client device are associated with a customer attempting to conduct an online transaction with a merchant via a merchant server device;
train a machine learning model to determine whether the customer is associated with a particular network address to generate a trained machine learning model,
wherein the one or more instructions, that cause the one or more processors to train the machine learning model, cause the one or more processors to:
obtain a set of observations including:
network addresses historically associated with the customer,
network addresses associated with financial institutions,
locations associated with the financial institutions, and
locations associated with the customer, and
partition the set of observations into a training set that includes a first subset of observations, of the set of observations, and a test set that includes a second subset of observations of the set of observations,
execute a regularized regression algorithm to determine a regression coefficient based on the training set, use one or more hyperparameter sets to tune the machine learning model,
wherein the one or more hyperparameter sets includes a strength of a penalty applied to the regression coefficient to mitigate overfitting of the machine learning model to the training set,
generate a cross-validation score for each hyperparameter set of the one or more hyperparameter sets to generate cross-validation scores,
select a hyperparameter set of the one or more hyperparameter sets based on comparing the cross-validation scores,
train the machine learning model based on the hyperparameter set,
test the machine learning model using the test set to determine a performance score, and
store the machine learning model as the trained machine learning model based on the performance score meeting a threshold;
process the transaction card number and the network address, with the trained machine learning model, to determine whether to approve or deny the online transaction,
wherein the one or more instructions, that cause the one or more processors to process the transaction card number and the network address, cause the one or more processors to:
determine, using the trained machine learning model, whether the customer uses virtual private network (VPN) services, and
determine, based on determining whether the customer uses the VPN services, whether the customer is associated with the network address; and
selectively:
provide, to the client device and the merchant server device, data indicating that the online transaction is approved when the machine learning model determines to approve the online transaction, or
provide, to the client device and the merchant server device, data indicating that the online transaction is denied when the machine learning model determines to deny the online transaction.

16. The non-transitory computer-readable medium of claim 15, wherein the one or more instructions, when executed by the one or more processors, further cause the one or more processors to:

provide, to a server device associated with a law enforcement agency, data identifying potential fraud associated with the transaction card number or the network address when the machine learning model determines to deny the online transaction.

17. The non-transitory computer-readable medium of claim 15, wherein the one or more instructions, when executed by the one or more processors, further cause the one or more processors to:
determine a geographical location of the network address,
wherein the one or more instructions, that cause the one or more processors to process the transaction card number and the network address, with the machine learning model, to determine whether to approve or deny the online transaction, cause the one or more processors to:
process data identifying the geographical location of the network address, the transaction card number, and the network address, with the machine learning model, to determine whether to approve or deny the online transaction.

18. The non-transitory computer-readable medium of claim 15, wherein the one or more instructions, that cause the one or more processors to process the transaction card number and the network address, with the machine learning model, to determine whether to approve or deny the online transaction, cause the one or more processors to:
compare the network address to a plurality of classless inter-domain routing ranges associated with the customer to determine whether to approve or deny the online transaction.

19. The non-transitory computer-readable medium of claim 18, wherein the one or more instructions, when executed by the one or more processors, further cause the one or more processors to one of:
approve the online transaction when the network address is provided in one of the plurality of classless inter-domain routing ranges associated with the customer; or
deny the online transaction when the network address is not provided in one of the plurality of classless inter-domain routing ranges associated with the customer.

20. The non-transitory computer-readable medium of claim 15, wherein the network address includes an Internet protocol (IP) address of the client device.

* * * * *